United States Patent
Peters et al.

(10) Patent No.: US 10,240,949 B2
(45) Date of Patent: Mar. 26, 2019

(54) LASER POSITIONING SYSTEM

(71) Applicant: Construction Robotics, LLC, Victor, NY (US)

(72) Inventors: Scott Lawrence Peters, Pittsford, NY (US); Glenn Dayton White, Conesus, NY (US); Rockwell Najeeb Yarid, Rochester, NY (US); Erwin Ludwig Allmann, Penfield, NY (US); Timothy Riley Voorheis, Rochester, NY (US)

(73) Assignee: Construction Robotics, LLC, Victor, NY (US)

( * ) Notice: Subject to any disclaimer, the term of this patent is extended or adjusted under 35 U.S.C. 154(b) by 324 days.

(21) Appl. No.: 15/009,958

(22) Filed: Jan. 29, 2016

(65) Prior Publication Data

US 2016/0223364 A1 Aug. 4, 2016

Related U.S. Application Data

(60) Provisional application No. 62/109,600, filed on Jan. 29, 2015.

(51) Int. Cl.
*G01D 5/26* (2006.01)
*G01C 15/00* (2006.01)

(52) U.S. Cl.
CPC ............. *G01D 5/26* (2013.01); *G01C 15/004* (2013.01)

(58) Field of Classification Search
CPC ................................ G01C 15/004; G01D 5/26
USPC .......................................................... 33/290
See application file for complete search history.

(56) References Cited

U.S. PATENT DOCUMENTS

| | | | |
|---|---|---|---|
| 3,950,914 A | | 4/1976 | Lowen |
| 4,820,041 A | * | 4/1989 | Davidson ............... E02F 3/842 33/293 |
| 4,993,160 A | * | 2/1991 | Fraley .................... G01C 15/02 33/286 |
| 5,284,000 A | | 2/1994 | Milne et al. |
| 5,285,205 A | * | 2/1994 | White ..................... B60Q 1/48 33/264 |

(Continued)

FOREIGN PATENT DOCUMENTS

| | | |
|---|---|---|
| DE | 3430915 A1 | 3/1986 |
| FR | 2919322 A1 | 1/2009 |

*Primary Examiner* — Yaritza Guadalupe
(74) *Attorney, Agent, or Firm* — Robert D. Gunderman, Jr.; Patent Technologies, LLC

(57) ABSTRACT

A laser positioning system is described. The laser positioning system provides a positioning and guidance system that is suitable for environments that have external disturbances such as those caused by wind, equipment movement, vibration, and the like. The laser positioning system of the present invention uses at novel laser line beacon positioning system in optical communication with a novel laser line receiver to achieve accurate positioning in environments with external disturbances, something that has previously not been attainable. In some embodiments, a target or series of targets are used to create a reference by which the laser line receiver and an associated moveable assembly such as a robotic arm assembly are able to accurately place building elements such as bricks. Exemplary applications of the laser positioning system include, but are not limited to, accurate positioning of bricks in a wall under construction by a robotic brick laying system.

20 Claims, 36 Drawing Sheets

(56) References Cited

U.S. PATENT DOCUMENTS

| | | | | |
|---|---|---|---|---|
| 5,810,674 A * | 9/1998 | Falossi | ............... | A63B 69/3614 33/700 |
| 6,256,895 B1 * | 7/2001 | Akers | .................. | G01C 15/004 33/286 |
| 6,370,837 B1 | 4/2002 | McMahon et al. | | |
| 6,415,518 B1 * | 7/2002 | Sims | .................. | E04G 21/1833 33/1 G |
| 6,508,006 B1 * | 1/2003 | Black | .................. | G01C 15/06 33/293 |
| 6,732,439 B1 * | 5/2004 | Radke | .................. | G01C 15/00 33/263 |
| 6,760,974 B1 * | 7/2004 | Jorgenson | ............... | E04F 21/24 33/228 |
| 6,868,847 B2 | 3/2005 | Ainedter et al. | | |
| 6,950,250 B2 * | 9/2005 | Kousek | ............... | G01C 15/006 33/293 |
| 7,111,437 B2 | 9/2006 | Ainedler | | |
| 7,448,138 B1 * | 11/2008 | Vanneman | ........... | G01C 15/006 33/290 |
| 7,456,943 B1 * | 11/2008 | Goad | .................... | G01C 15/002 342/118 |
| 8,166,727 B2 | 5/2012 | Pivac et al. | | |
| 8,965,571 B2 * | 2/2015 | Peters | .................... | E04G 21/22 52/749.14 |
| 2005/0086901 A1 | 4/2005 | Chisholm | | |
| 2008/0053941 A1 * | 3/2008 | Tsukamoto | .......... | B65G 1/0421 211/134 |
| 2008/0109181 A1 * | 5/2008 | Brabec | ................ | G01C 15/004 702/97 |
| 2009/0038258 A1 * | 2/2009 | Pivac | ........................ | B25J 5/00 52/749.14 |
| 2011/0235053 A1 * | 9/2011 | Campagna | ........... | G01C 15/004 356/614 |
| 2012/0053726 A1 * | 3/2012 | Peters | .................... | E04G 21/22 700/252 |
| 2014/0202013 A1 * | 7/2014 | Smith | ...................... | G01C 3/08 33/286 |
| 2016/0223364 A1 * | 8/2016 | Peters | .................... | G01D 5/26 |
| 2017/0025761 A1 * | 1/2017 | Kim | ........................ | H01Q 9/42 |
| 2017/0254102 A1 * | 9/2017 | Peters | .................... | E04G 21/22 |

\* cited by examiner

LASER POSITIONING SYSTEM

CROSS REFERENCE TO RELATED PATENT APPLICATIONS

This application claims priority to U.S. patent application Ser. No. 62/109,600 filed Jan. 29, 2015 entitled "Laser Positioning System" by Scott Lawrence Peters et al., the entire disclosure of which is incorporated herein by reference.

BACKGROUND OF THE INVENTION

1. Field of the Invention

The present invention relates generally to positioning systems, and more particularly to a Laser Positioning System that defines the absolute position of an element under the influence of external disturbances.

2. Description of the Related Art

Positioning systems are useful for many applications where elements are placed, assembled, moved, re-oriented, or otherwise positioned. Sensing and measuring systems have in recent years made extensive use of lasers and related equipment to determine distance, create a straight line, and the like. There has been a proliferation in the construction trade (as well as other fields of endeavor) of inexpensive laser levels, plumb laser devices, laser measurement tools, laser range finders, laser micrometers, laser scanners, laser angle measures, and the like. These tools have proven invaluable in the construction of buildings and walls, construction site preparation, agricultural field preparation and maintenance, construction of various manmade structures, and general architectural and surveying applications. Many of these existing laser based systems do not accommodate external disturbances or movement. The precise nature of a laser beam is very useful in measurement systems, but also presents a problem when the external environment contains movement or disturbances. One example of an environmental disturbance that renders a laser based measurement system inoperable is that of fog or rain. Moisture in the traveling pathway of the laser beam attenuates and disperses the laser beam such that it does not reach its intended sensing or receiving target. Another example of an externality is the introduction of movement, vibration or other mechanical disturbances that displace the laser beam from its intended trajectory such that it does not reach its intended sensing or receiving target. While disturbance compensation using mathematical techniques to remove the disturbance empirically can be adapted to such situations, and stabilization techniques to reduce or eliminate the disturbance can also he used, oftentimes the disturbance is such that it either cannot be entirely stabilized through mechanical means, or the movement is such that the laser beam does not hit its intended sensing or receiving target and mathematical techniques cannot be employed without received data from an incident laser hit. In an application such as a robotic brick laying system, as described in U.S. Pat. No. 8,965,571 B2 to Peters et al. and entitled "Brick Laying System", the ability to locate and sense a laser signal is of paramount importance in the placement of bricks or other building elements by the robotic arm assembly described in the '571 patent. The entire disclosure of U.S. Pat. No. 8,965,571 B2 to Peters et al. and entitled "Brick Laying System" is incorporated herein by reference in its entirety.

It is thus an object of the present invention to provide a laser positioning system that defines the absolute position of each element. It is another object of the present invention to provide a laser positioning system with a large field of vision for receiving a transmitted laser signal. It is another object of the present invention to provide a laser positioning system that is fully operational in an environment having external mechanical disturbances. It is yet another object of the present invention to provide a laser positioning system that has control feedback to compensate for external disturbances. These and other objects of the present invention are not to be considered comprehensive or exhaustive, but rather, exemplary of objects that may be ascertained after reading this specification and claims with the accompanying drawings.

BRIEF SUMMARY OF THE INVENTION

In accordance with the present invention, there is provided a laser positioning system comprising a laser line beacon positioning system where the laser line beacon positioning system comprises a laser story pole and a laser line beacon. A target story pole may be incorporated in some embodiments of the present invention that has at least one target for alignment with the laser line beacon positioning system. In some applications a laser line receiver is coupled to a moveable assembly for intercepting laser light from the laser line beacon positioning system, thus providing a reference for accurate moveable assembly motion.

The foregoing paragraph has been provided by way of introduction, and is not intended to limit the scope of the invention as described by this specification, claims and the attached drawings.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims, and drawings attached hereto.

DESCRIPTION OF THE PREFERRED EMBODIMENTS

The laser positioning system of the present invention provides a positioning and guidance system that is suitable for environments that have external disturbances such as those caused by wind, equipment movement, vibration, and the like. Exemplary applications of the laser positioning system include, but are not limited to, accurate positioning of bricks in a wall under construction by a robotic brick laying system. An example of such a robotic brick laying system is described in United States Patent Application Publication US2012/0053726 A1 to Peters et al. and entitled "Brick Laying System", the entire disclosure of which is incorporated herein by reference in its entirety.

The laser positioning system of the present invention uses a novel arrangement of a laser line beacon positioning system in optical communication with a laser line receiver to achieve accurate positioning in environments with external disturbances, something that has previously not been attainable. While the laser positioning system of the present invention is well suited for linear positioning, the system of the present invention is equally well suited for angular measurement and positioning as well.

Turning now to the drawings, the laser line beacon positioning system and related components, as well as the laser line receiver will be described, along with the various components thereof. It should be noted that the drawings and specification describe the laser positioning system of the present invention to use with a robotic brick laying system as an example, and not a limitation, of the present invention. After a review of this specification and drawings, one can appreciate that the applications of such a laser positioning system are numerous, and are not limited to robotic brick laying.

Figure 1:
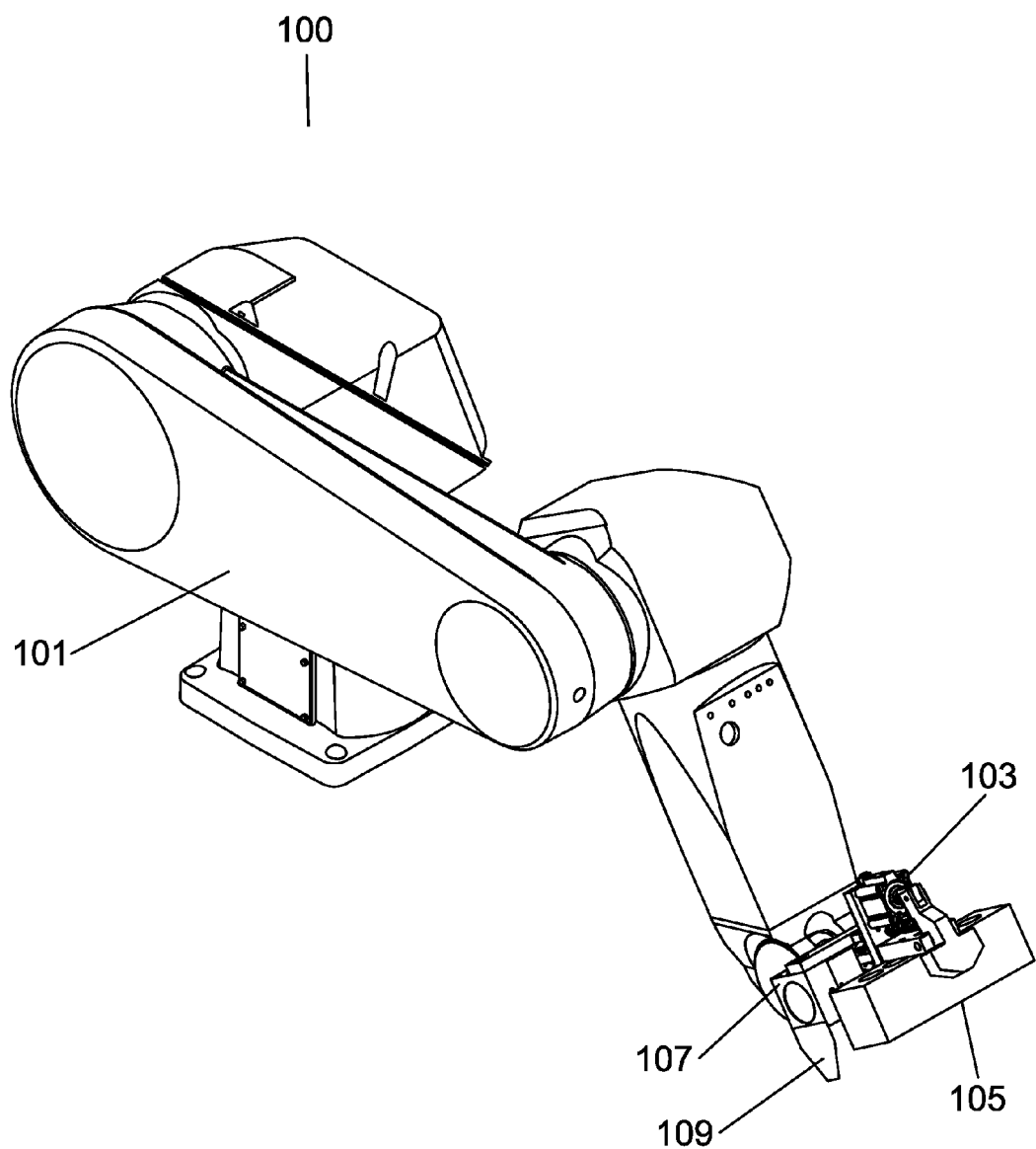
FIG. 1 is a perspective view of the robotic arm assembly of the present invention.

The laser line receiver 107 is depicted in FIG. 1 as part of a moveable assembly such as the robotic arm assembly 100. The laser line receiver 107 may also be attached to or otherwise coupled with other moveable assemblies and placement devices including, for example, conveyers, cranes, control heads, writing heads, cutting heads, and the like. The laser line receiver 107 works in cooperation with signals received from the laser line beacon positioning system 400 (see FIGS. 3 and 4).

In FIG. 1, a robotic arm 101 is depicted with an end effector 103 grasping a brick 105. A laser line receiver 107 can be seen attached to the robotic arm 101. The laser line receiver 107 will be further described herein, but serves to receive a laser signal from the laser line beacon positioning system, the point of incidence of the laser signal being received and converted to position or coordinate information that can be used by a microprocessor, microcontroller, or the like to achieve positioning of the element being retained by the robotic arm, in this example a brick. In FIG. 1, a laser reflector plate 109 can he seen attached to the robotic arm 101. The laser reflector plate 109 reflects a laser signal from the laser range finder 411 (see FIG. 4) to assist in the determination of distance by the laser range finder 411. The laser reflector plate 109 is made from an optically reflective material. The laser range finder incorporates both a laser for transmission of laser light and a receiver for detection thereof.

Figure 2:
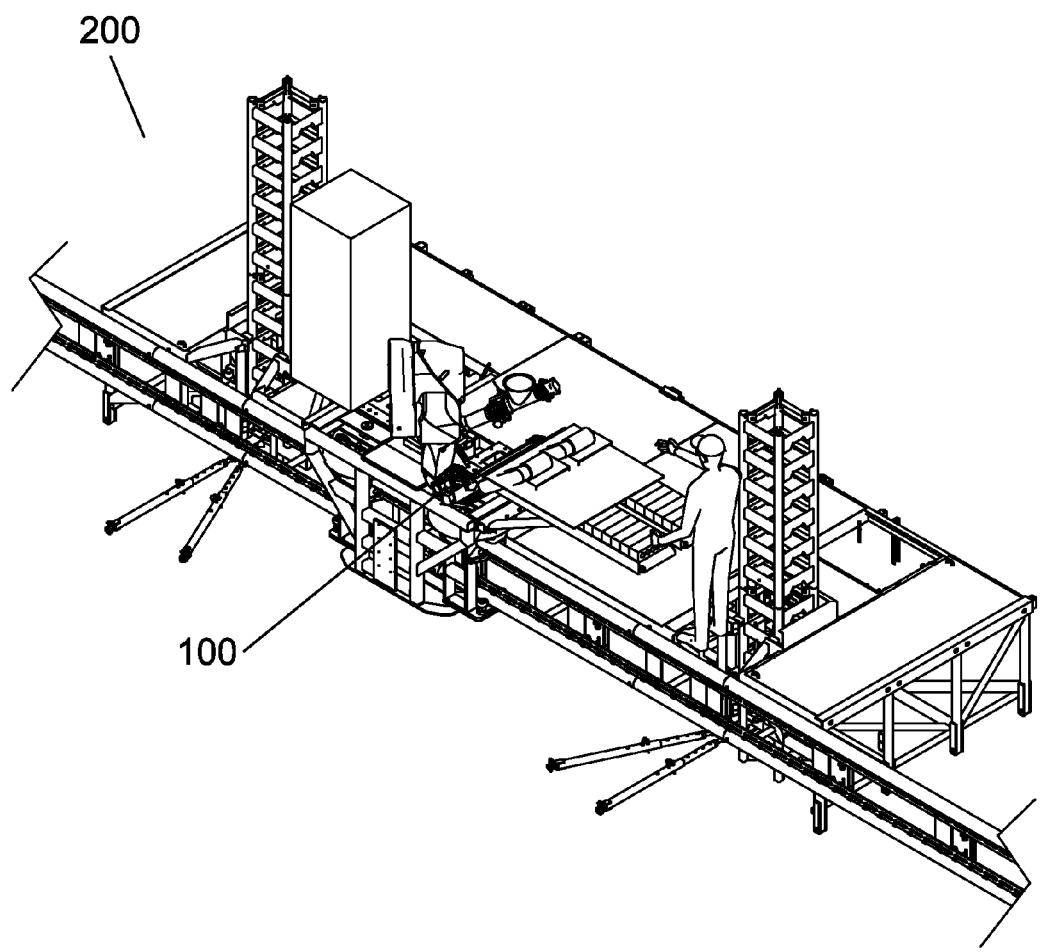
FIG. 2 is a perspective view of the brick laying system of the present invention.

FIG. 2 is a perspective view of a brick laying system 200 that incorporates the present invention, showing a wall under construction with supporting scaffolding. The robotic arm assembly 100 can be seen toward the center of the system in FIG. 2. U.S. Pat. No. 8,965,571 B2 to Peters et al. and entitled "Brick Laying System" describes such a brick laying system. The entire disclosure of U.S. Pat. No. 8,965,571 B2 to Peters et al. and entitled "Brick Laying System" is incorporated herein by reference in its entirety.

Figure 3:
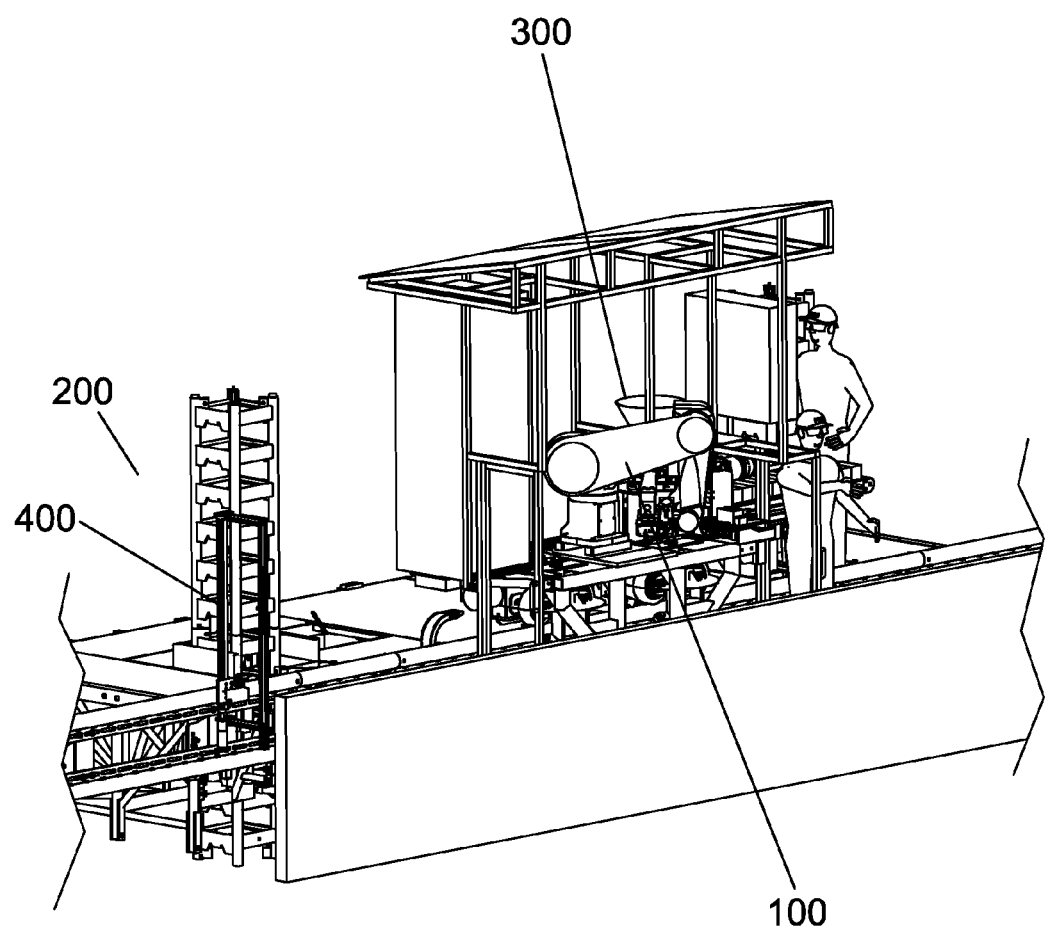
FIG. 3 is a close up view of the brick laying system of the present invention.

FIG. 3 is a close up view of the brick laying system 200 of the present invention where the robotic arm assembly 100 can be seen with the laser line receiver attached. The laser line beacon positioning system 400 can also be seen firmly attached to the supporting structure of the wall under construction.

Figure 4:
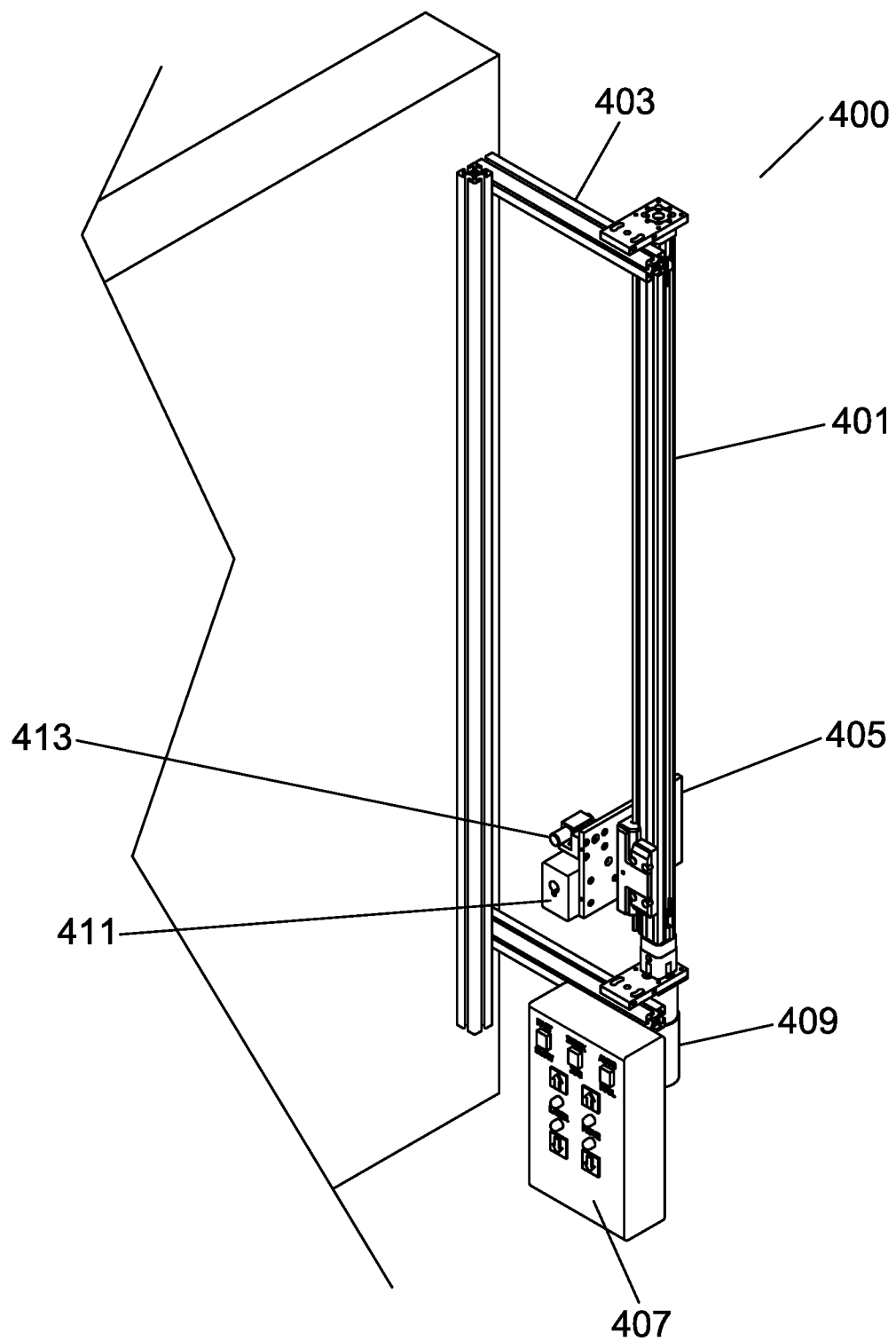
FIG. 4 is a close up perspective view of the laser line beacon positioning system of the present invention.

FIG. 4 is a close up perspective view of the laser line beacon positioning system 400. The laser line beacon positioning system 400 comprises a laser line beacon 413 and a laser range finder 411 attached to a moveable carriage 405 where the moveable carriage 405 traverses a fixed laser story pole 401. The laser line beacon 413 is the datum for aligning elements such as bricks in the x and z dimensions. It should be noted that the x and z coordinates described herein are merely a description of any two axes, and could equally as well be described as x and y or the like. The laser line beacon 413 is any suitable laser where the laser signal from the laser line beacon 413 impacts the laser line receiver 107 (see FIG. 1), which in turn provides information that relates to x and z coordinate measurements. The laser line beacon 413 comprises a laser light source capable of producing a laser light that is capable of reaching the laser line receiver 107. The laser line beacon 413 is pulsed on and off at a high frequency in conjunction with the laser line receiver 107 to measure and compensate for ambient light variations. Essentially, the signal received by the laser line receiver 107 with the laser line beacon 413 turned off is subtracted from the signal received by the laser line receiver 107 with the laser line beacon turned on using signal processing techniques. Both laser sources (the laser line beacon 413 and the laser range finder 411) are mounted to a carriage 405 that is driven along a laser story pole 401 by an actuator such as a motor 409. The carriage 405 and the laser story pole 401 are made from a material such as a metal or a plastic, and the laser line beacon positioning system 400 is mounted to a structural element of the wall or building component under construction. A control box 407 containing motor drive components can be seen in FIG. 4, and provides user interface controls to drive the carriage 405 and associated laser components along the laser story pole 401. The laser story pole 401 may employ standoffs 403, brackets, flanges, mounting straps, magnets, adhesives, or other techniques to attach the laser line beacon positioning system 400 securely to a structural clement of the wall or building component under construction.

Figure 5:
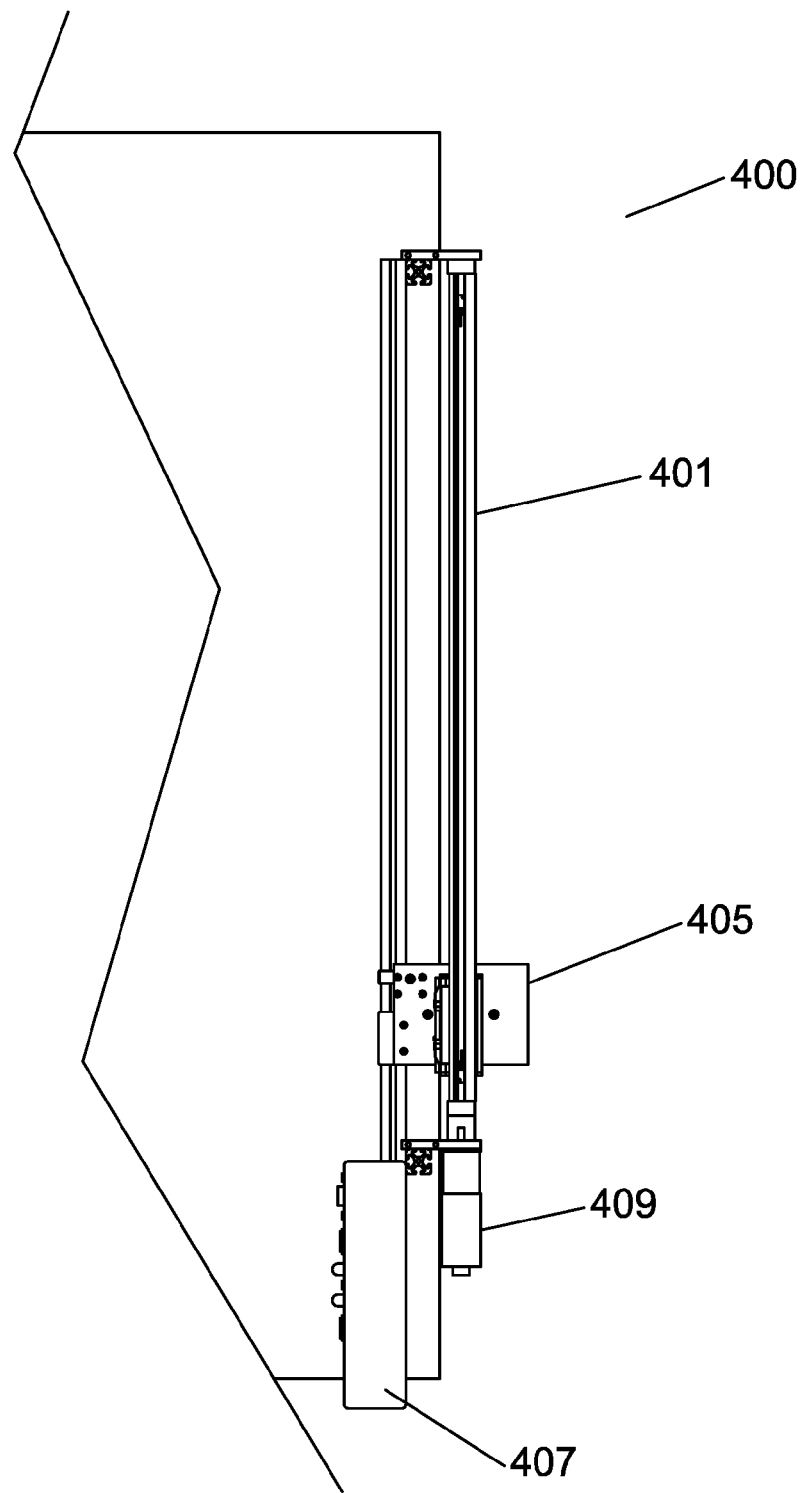
FIG. 5 is an end view of the laser line beacon positioning system of FIG. 4.
Figure 6:
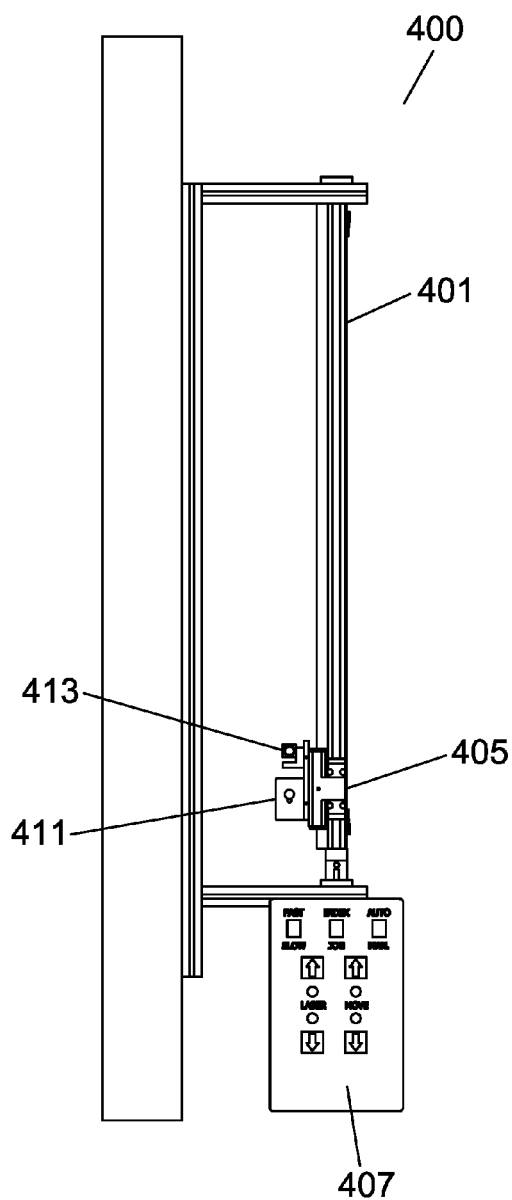
FIG. 6 is a side view of the laser line beacon positioning system of FIG. 4.
Figure 7:
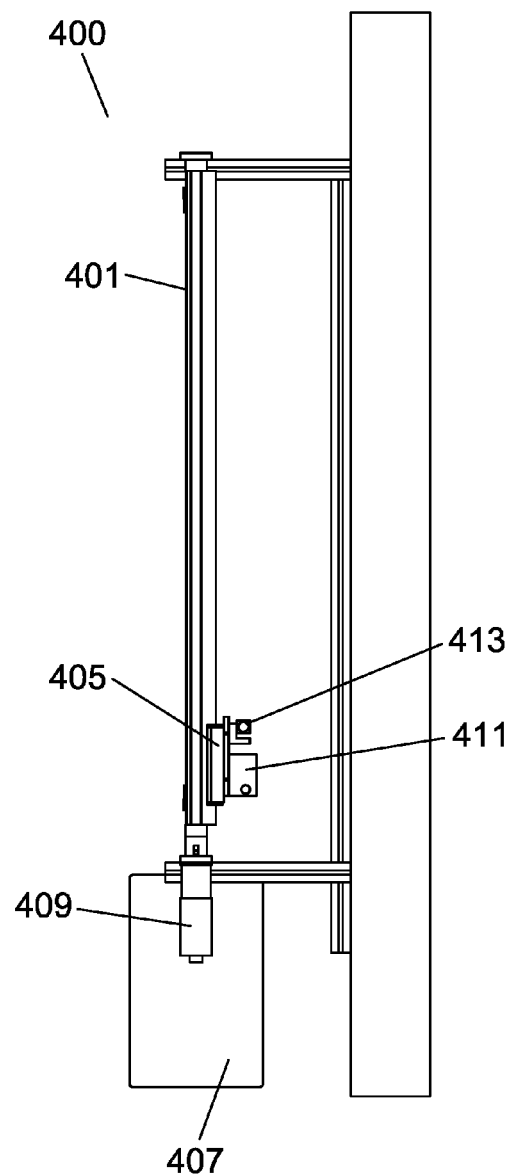
FIG. 7 is an opposing side view of the laser line beacon positioning system of FIG. 4.
Figure 8:
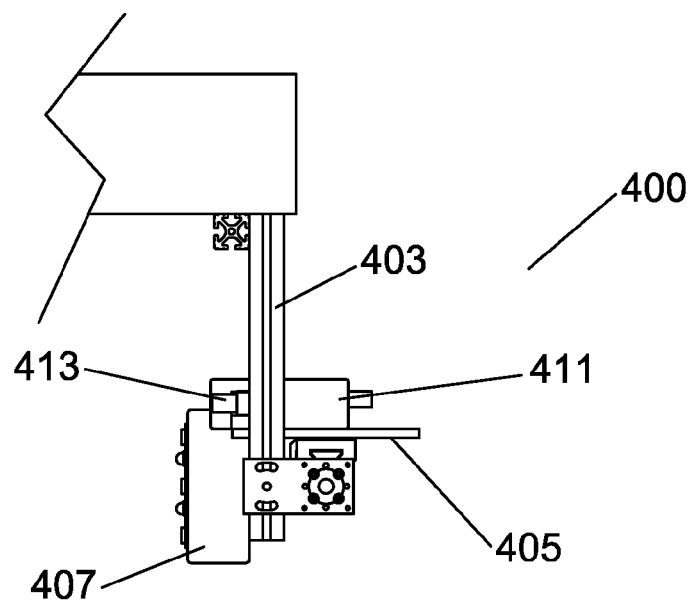
FIG. 8 is a to view of the laser line beacon positioning system of FIG. 4.
Figure 9:
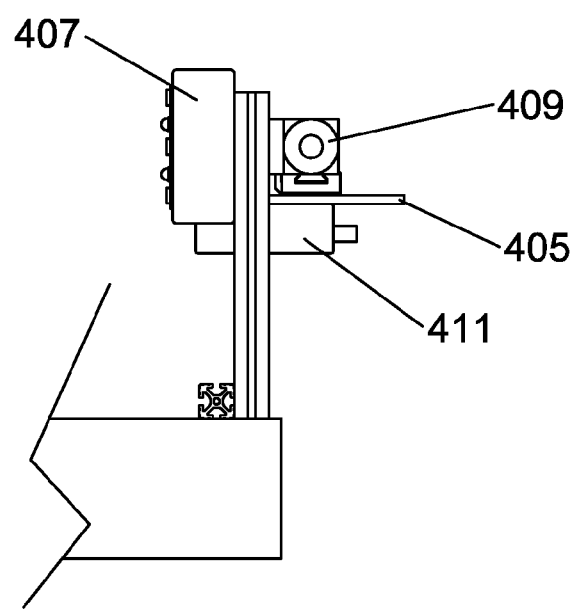
FIG. 9 is a bottom view of the laser line beacon positioning system of FIG. 4.
Figure 10:
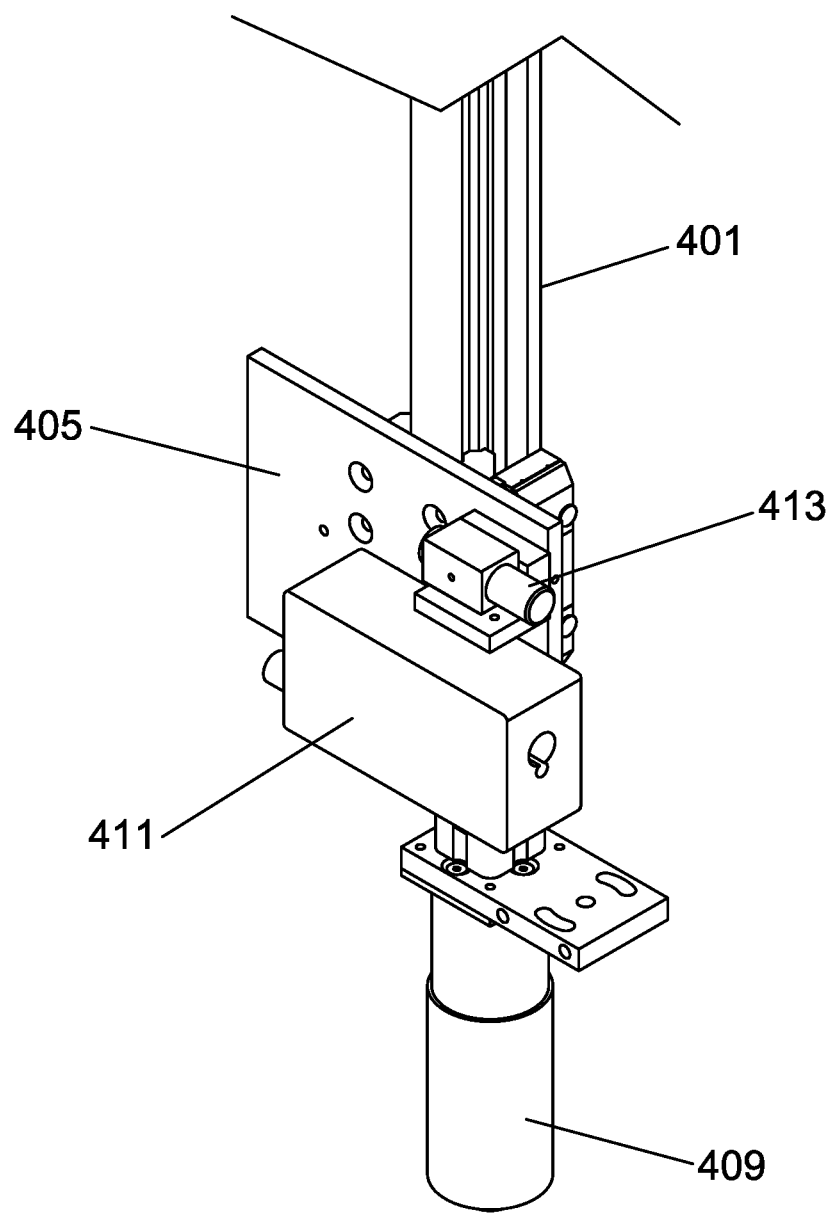
FIG. 10 is a close up perspective view of the moveable portion of the laser line beacon positioning system of FIG. 4.

For a comprehensive understanding of the laser line beacon positioning system, FIG. 5 is an end view of the laser line beacon positioning system. FIG. 6 is a side view of the laser line beacon positioning system. FIG. 7 is an opposing side view of the laser line beacon positioning system. FIG. 8 is a top view of the laser line beacon positioning system of FIG. 4. FIG. 9 is a bottom view of the laser line beacon positioning system. FIG. 10 is a close up perspective view of the moveable portion of the laser line beacon positioning system of FIG. 4.

Figure 11:
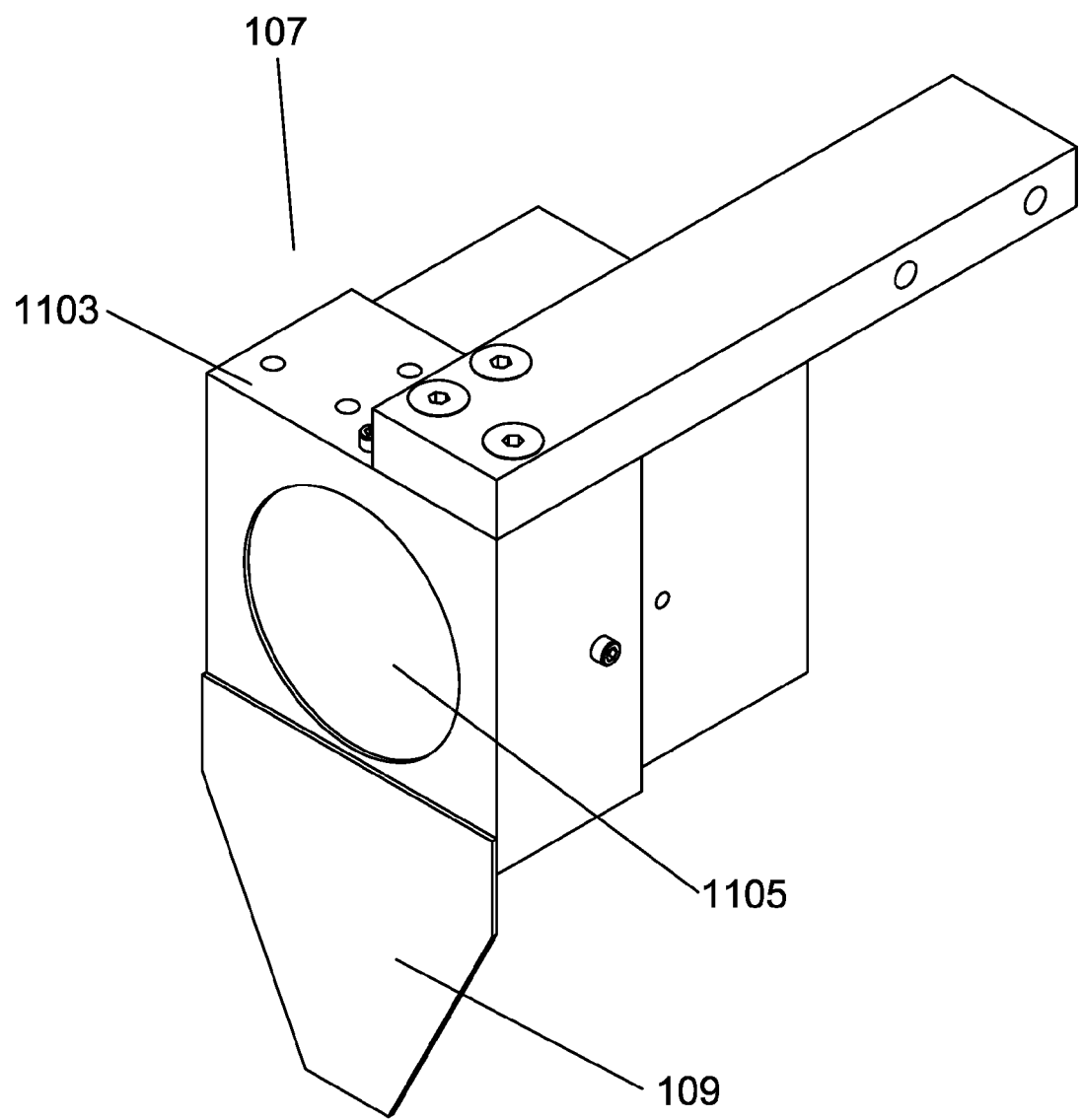
FIG. 11 is a perspective view of the laser line receiver of the present invention.

In optical communication with the laser line beacon positioning system 400 is a laser line receiver 107. Referring now to FIG. 11, a perspective view of the laser line receiver is depicted. The laser line receiver 107 has a reflective surface such as the laser reflector plate 109 that provides an optical return path for the laser range finder 411. The laser reflector plate 109 may be mounted to the housing 1103, a mounting member, an clement of the robotic arm 101 (see FIG. 1), or the like. The laser line receiver 107 in one embodiment comprises a fiber optic bundle 1105 where the receiving side of the fiber optic bundle 1105 has a greater surface area than the sensing side of the fiber optic bundle 1105 to effectively increase the laser sensing area of the laser line receiver 107, a duo-lateral sensor in optical communication with the sensing side of the fiber optic bundle 107, and an ambient light filter that passes laser light to the duo-lateral sensor but limits ambient light to the duo-lateral sensor. The receiving side of the fiber optic bundle 1105 is visible in FIG. 11 and is visible to the laser line beacon 413 in use. The receiving side of the fiber optic bundle 1105 is exposed by a cutout in the housing 1103. The housing 1103 contains the duo-lateral sensor, the ambient light filter, and associated electronics (not seen). To allow for the operation of the laser positioning system in environments with mechanical disturbances where the laser signal may be subject to movements such that the duo-lateral sensor by itself cannot he incident upon by the laser signal, the fiber optic bundle 1105 presents a greater surface area upon which a laser signal may terminate. It should be noted that in some embodiments of the present invention, the laser line receiver may comprise other optical detectors such as, for example, a camera that views the termination of the laser signal from the laser line beacon positioning system. Other suitable optical detectors include, for example, a photo detector or photo detector array, a photosensitive detector or detectors such as photosensitive diodes, and the like.

Figure 12:
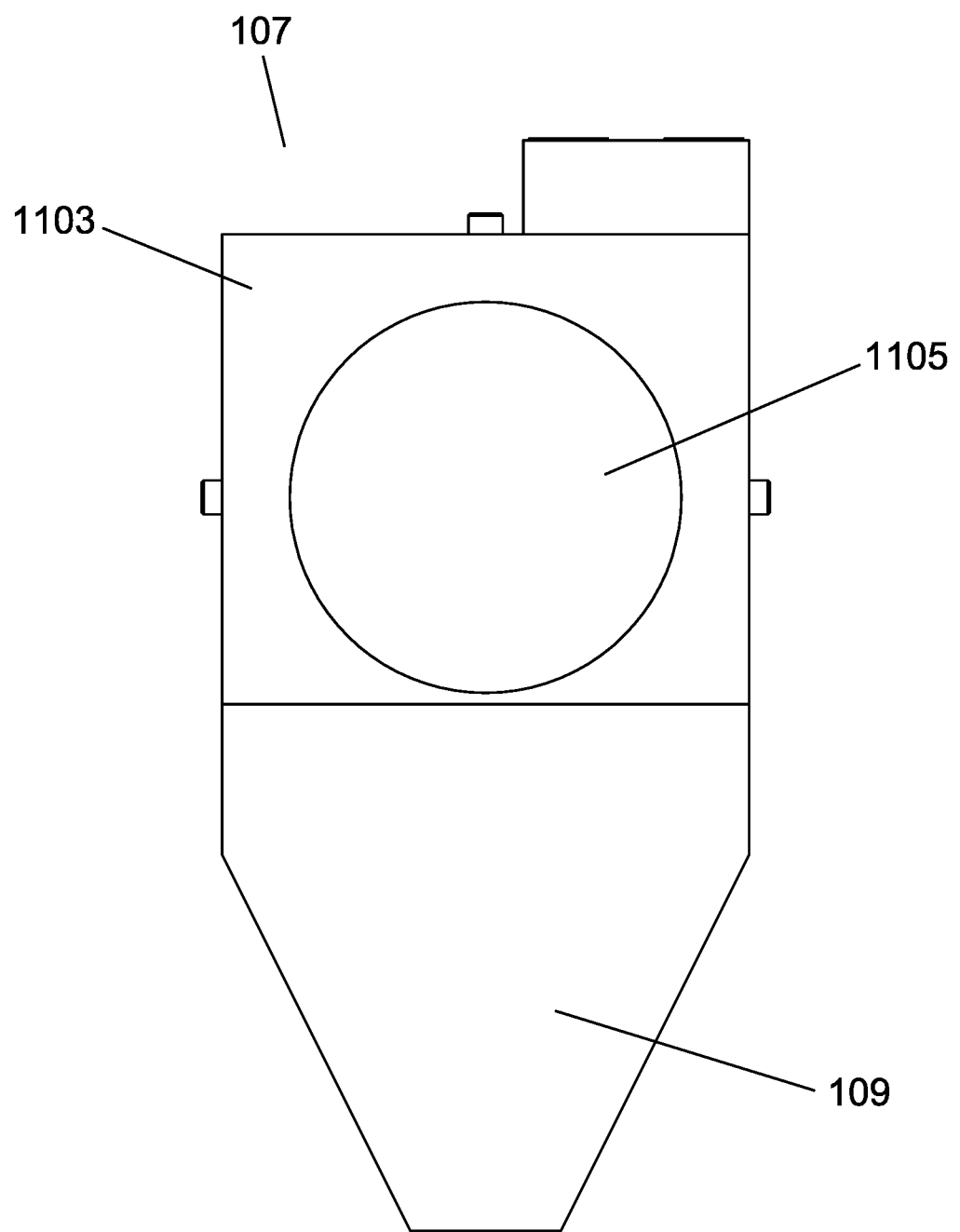
FIG. 12 is a plan view of the laser line receiver of the present invention showing the receiving surfaces.
Figure 13:
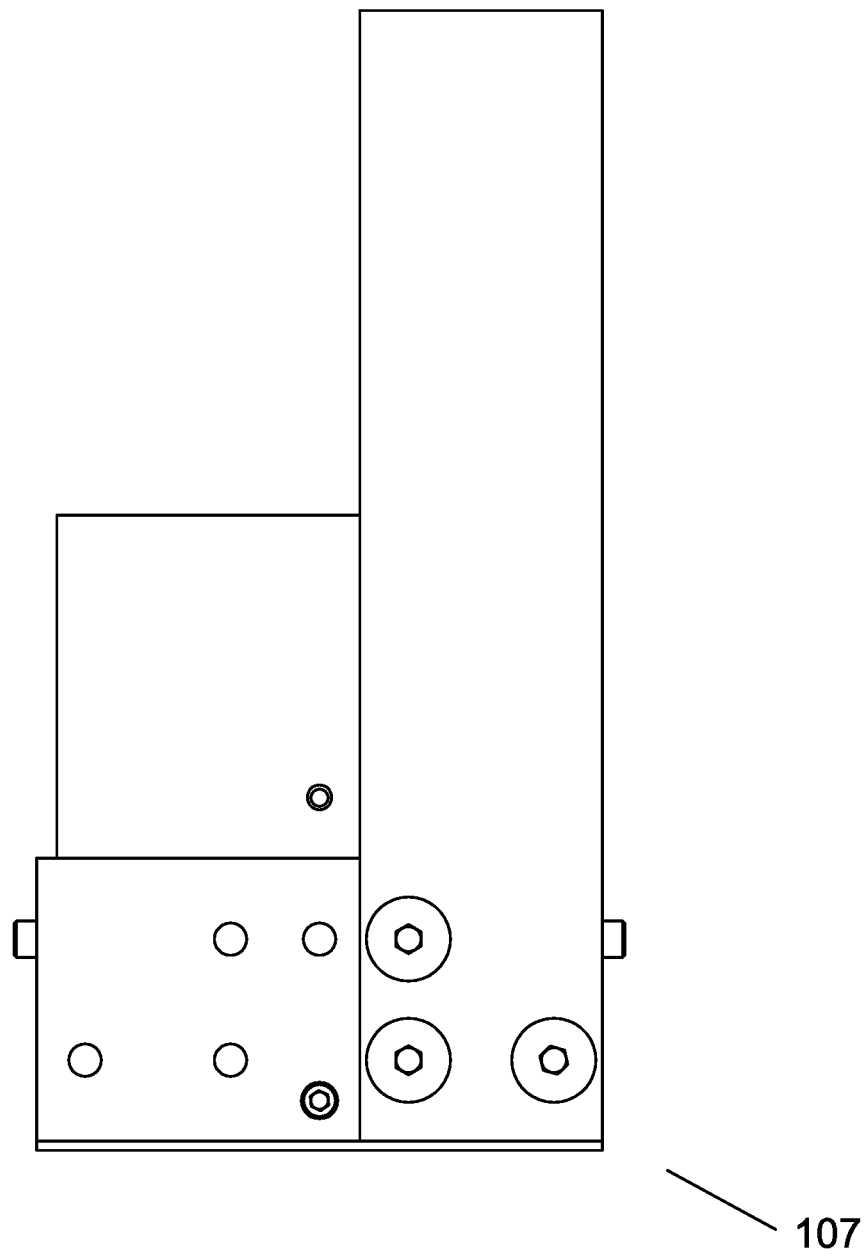
FIG. 13 is a top plan view of the laser line receiver of the present invention.
Figure 14:
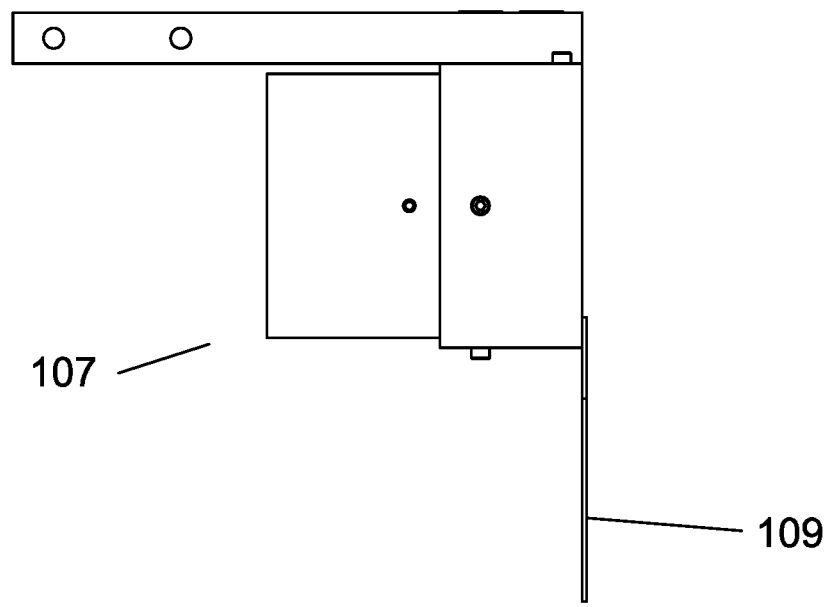
FIG. 14 is a front plan view of the laser line receiver of the present invention.
Figure 15:
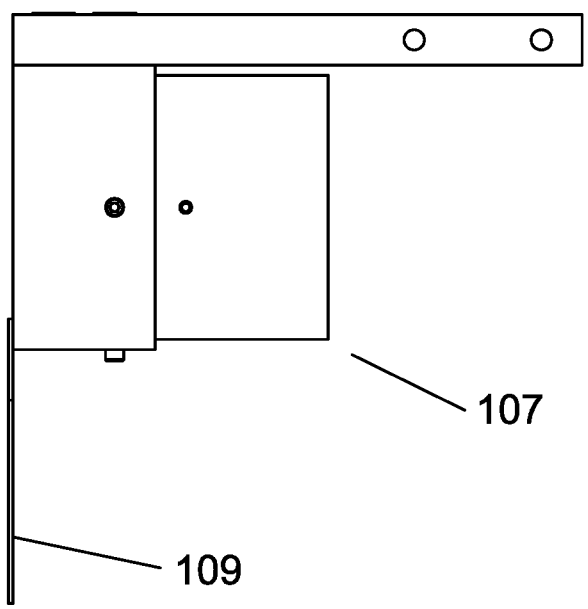
FIG. 15 is a back plan view of the laser line receiver of the present invention.

FIG. 12 is a plan view of the laser line receiver of the present invention showing an example of receiving surfaces. FIG. 13 is a top plan view of the laser line receiver. FIG. 14 is a front plan view of the laser line receiver. FIG. 15 is a back plan view of the laser line receiver of the present invention.

Figure 16:
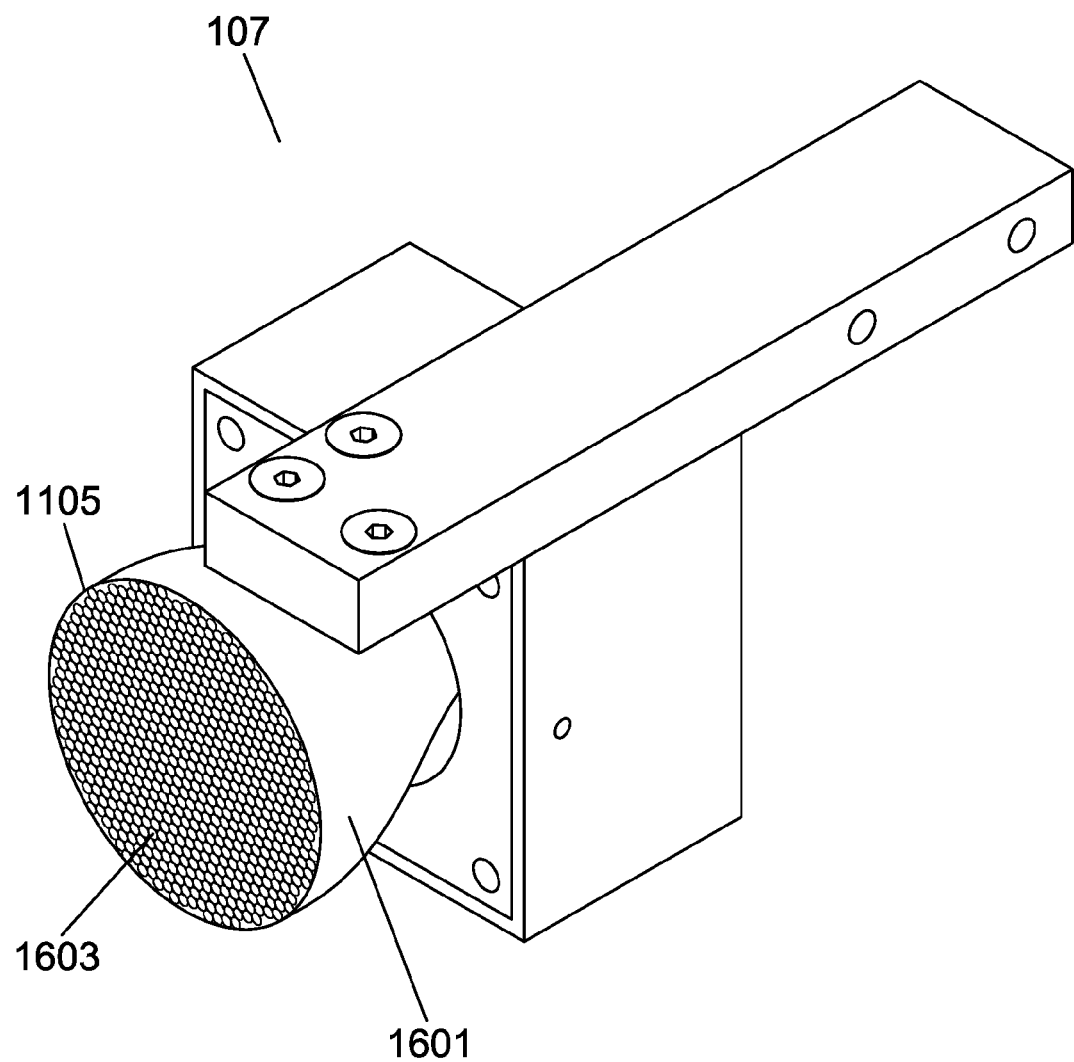
FIG. 16 is a perspective view of the laser line receiver of FIG. 11 with the housing removed to show the fiber optic bundle.

FIG. 16 is a perspective view of the laser line receiver of FIG. 11 with the housing removed to show the fiber optic bundle 1105. The fiber optic bundle is as grouping of multiple optical fibers that have a taper or reduction in diameter such as, for example and not limitation, a starting bundle diameter of 67 millimeters and a terminating bundle diameter of 25 millimeters. The overall length of the fiber optic bundle may be, by example and not limitation, 72 millimeters. The fibers themselves may have a diameter of, for example, 10 micrometers. An example of such a bundle is that manufactured by Schott North America, Inc. and referred to in their literature as a fiber optic taper. A fiber optic taper is a coherent fiber optic structure that transmits either a magnified or a reduced image from its input surface to its output surface. Magnification is thus a ratio of the diameters of the large and small end of the tapers. As evident from FIG. 16, the fiber optic bundle 1105 has a taper 1601 to reduce an incident laser signal to the surface area of the duo-lateral sensor, thus effectively increasing the incident surface area available to the duo-lateral sensor. The duo-lateral sensor is not depicted in FIG. 16, but is in optical communication with the sensing side of the fiber optic bundle (the smaller diameter side of the fiber optic bundle). The duo-lateral sensor is a dual axis position sensing structure such as a sensing diode surface having an active area. An example of such a sensor is the DL400-7-PCBA dual axis position sensing diode with sum and difference amplifiers manufactured by First Sensor Incorporated of Westlake Village, Calif. The duo-lateral sensor may also have sum and difference amplifiers or an amplifier circuit or circuits to convert the sensing diode output into an analog bipolar voltage signal or signals representing the x and z position of the light spot centroid incident on the diode surface. X and Z current representations may also be used. The duo-lateral sensor thus senses the position of a light spot on the surface of the sensing diode and provides voltage analogs of X and Z coordinates as well as, in some embodiments of the present invention, spot intensity. The sensing diode may be silicon based to respond to light wavelengths between 400 nanometers and 1100 nanometers. The sensing diode is a photodiode with electrodes placed at the edges of the photodiode. The resistive sheets in turn cover the pn junction of the diode. As light strikes the photodiode, the pn junction causes a current to flow at the centroid of the incident light. The current then separates from this source at the top resistive sheet, and electrodes at opposite ends of the sensor collect the individual currents. The bottom resistive sheet acts in a similar manner, except that the current is in the opposite direction. In some embodiments of the present invention, the duo-lateral sensor may comprise stacked, adjacent, or large diameter duo-lateral sensors in combination with, or to the exclusion of, the fiber optic bundle. The smaller diameter of the fiber optic bundle terminates, and is in optical communication with, the sensing surface of the sensing diode. The incident surface 1603 of the fiber optic bundle 1105 is the larger diameter side of the fiber optic bundle and is the surface upon which the laser signal from the laser line beacon 413 terminates. The fiber optic bundle is superior to standard optics such as lenses and mirrors since it eliminates angular light incidence dependency, providing for the necessary accuracy of light incidence on the duo-lateral sensor. Various mounting structures such as brackets, straps, bolts, rivets, screws, and the like may be employed to mount the laser line receiver 107 to the robotic arm or other moveable assembly.

Figure 17:
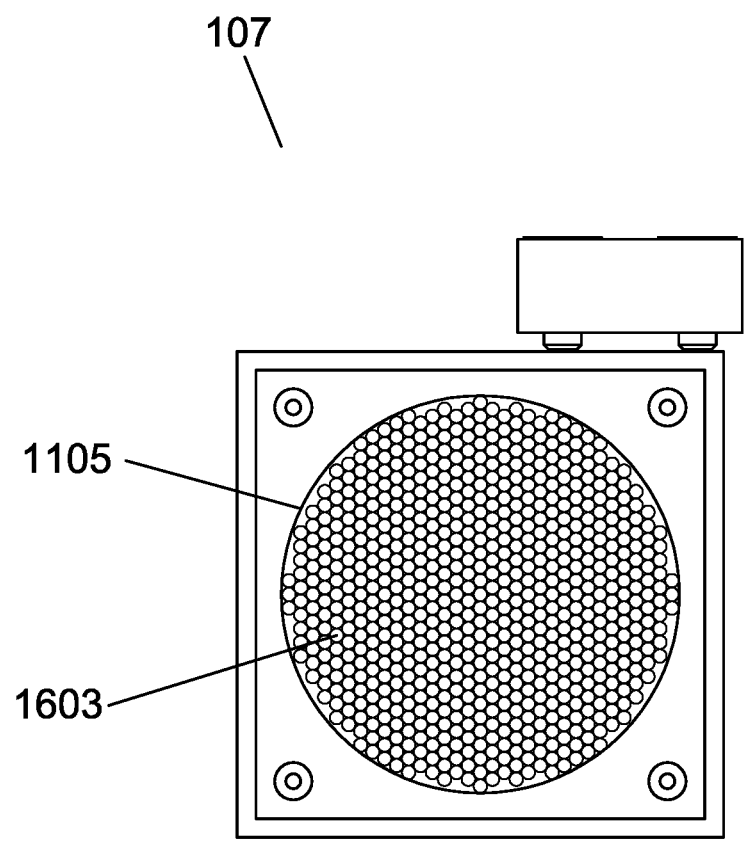
FIG. 17 is a perspective view of the laser line receiver of FIG. 16 showing the receiving face of the fiber optic bundle.
Figure 18:
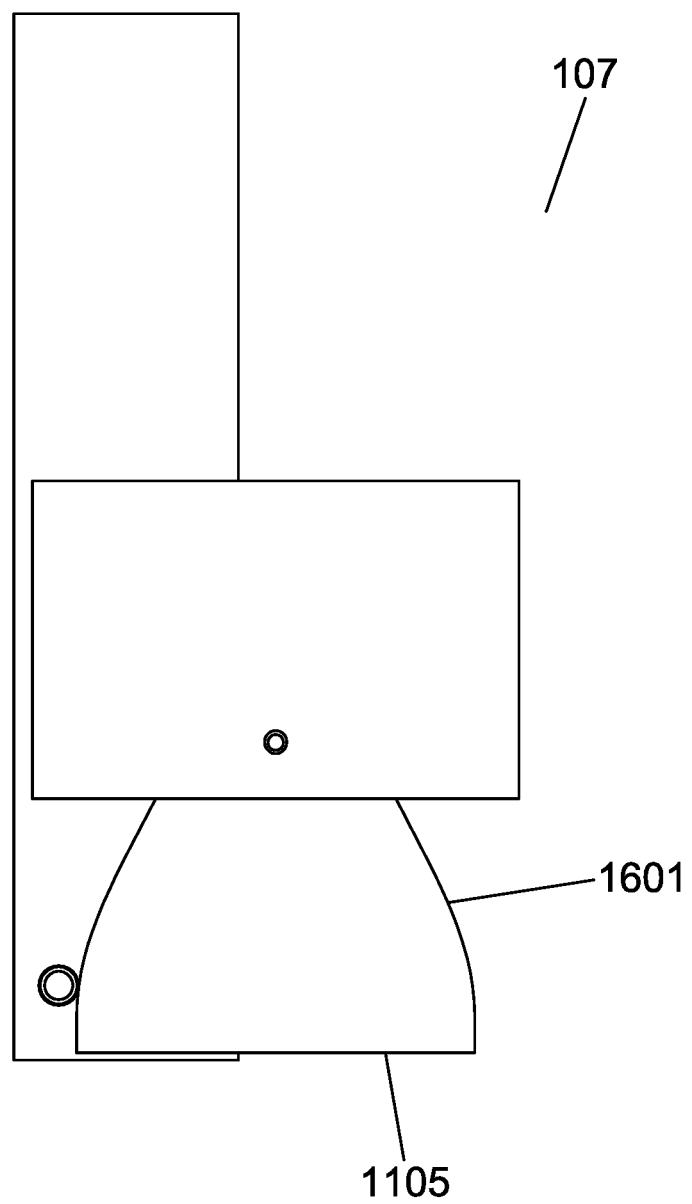
FIG. 18 is a bottom plan view of the laser line receiver of FIG. 16.
Figure 19:
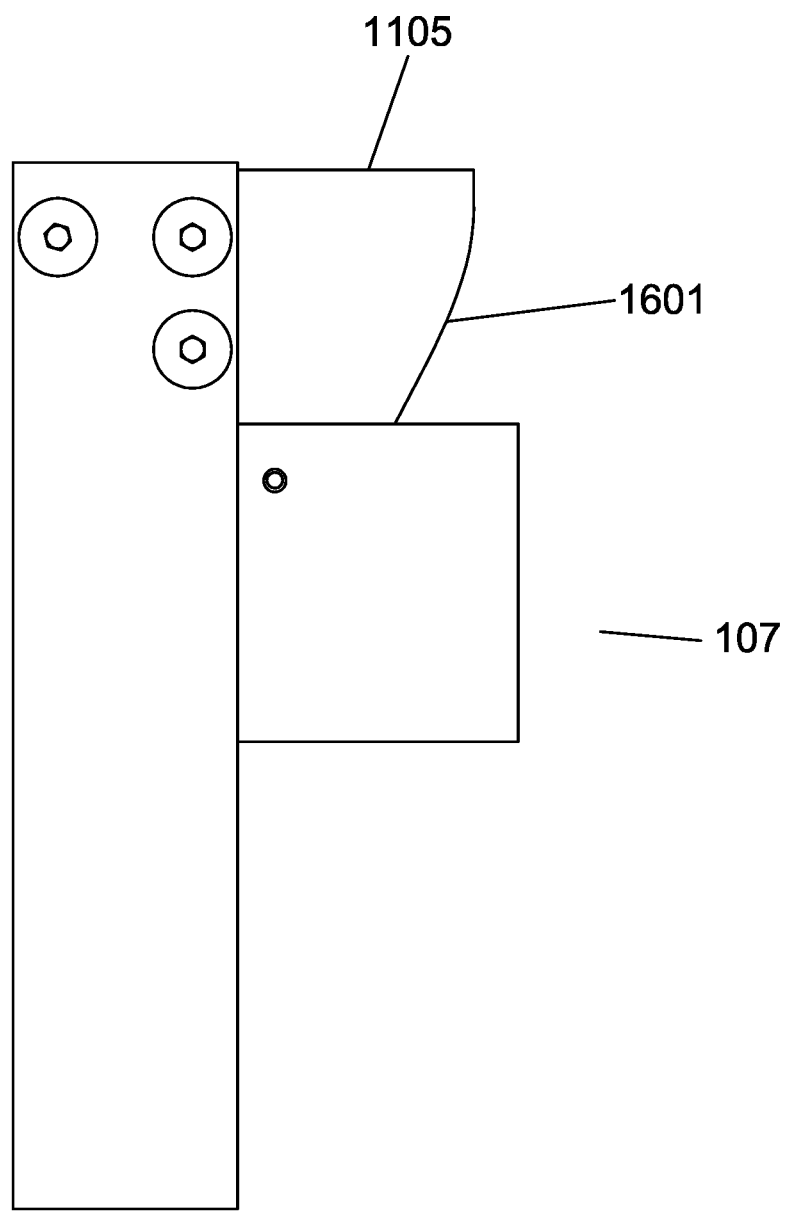
FIG. 19 is a top plan view of the laser line receiver of FIG. 16.
Figure 20:
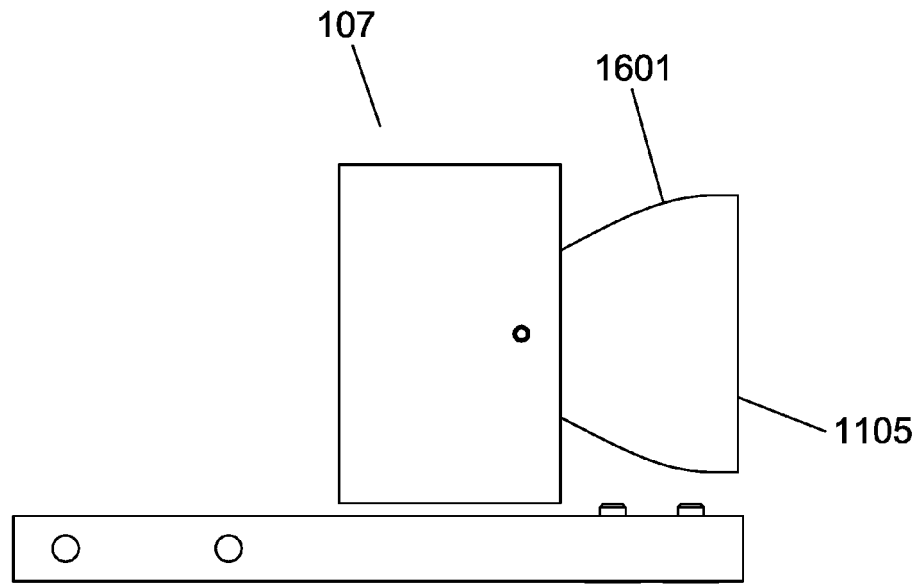
FIG. 20 is a front plan view of the laser fine receiver of FIG. 16.
Figure 21:
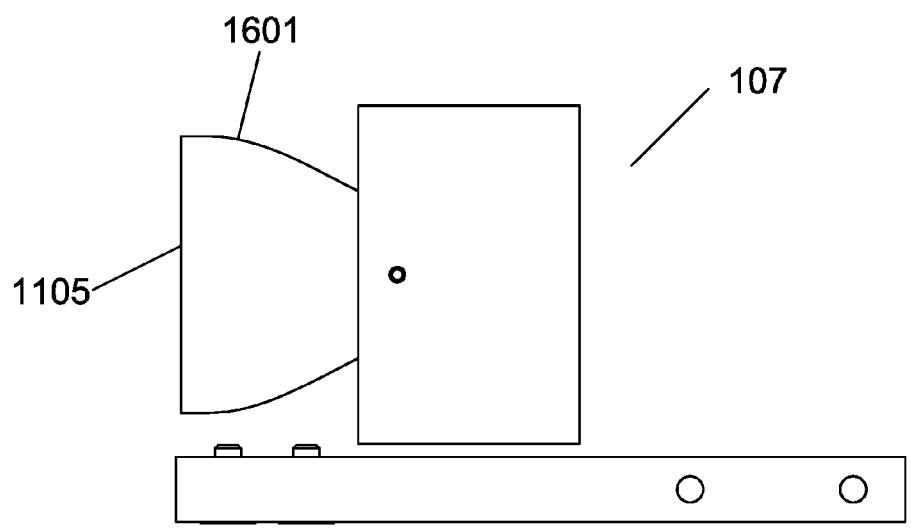
FIG. 21 is a back plan view of the laser line receiver of FIG. 16.

FIG. 17 is a plan view of the laser line receiver of FIG. 16 showing the receiving face of the fiber optic bundle. FIG. 18 is a bottom plan view of the laser line receiver of FIG. 16. FIG. 19 is a top plan view of the laser line receiver of FIG. 16. FIG. 20 is a front plan view of the laser line receiver of FIG. 16. FIG. 21 is as back plan view of the laser line receiver of FIG. 16.

Now turning to FIGS. 22-44, a second embodiment of the laser positioning system is depicted.

Figure 22:
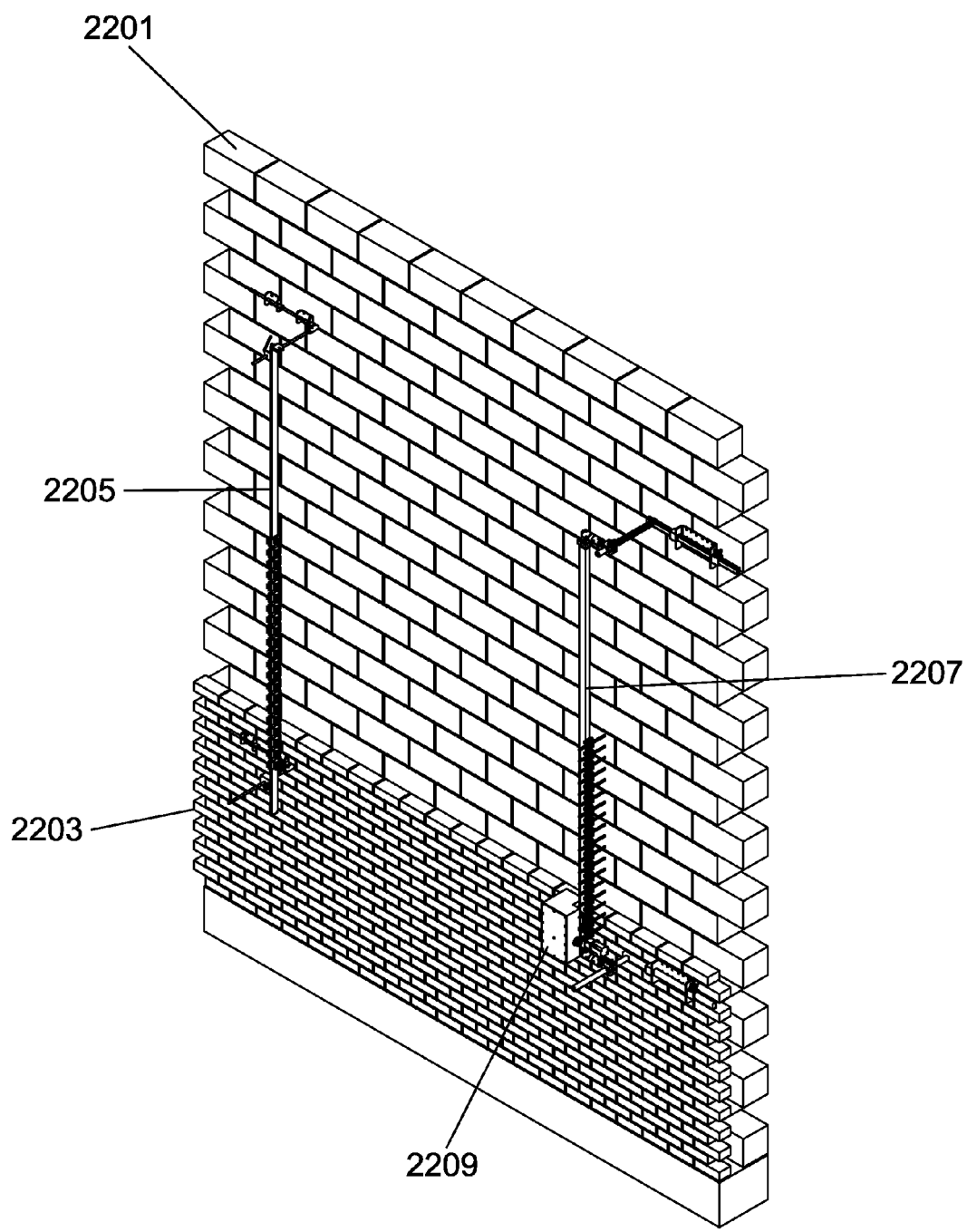
FIG. 22 is a perspective view of a second embodiment of the laser positioning system of the present invention without an intervening robotic arm.

FIG. 22 depicts a perspective view of a second embodiment of the laser positioning system of the present invention without an intervening moveable assembly such as a robotic arm. An intervening moveable assembly such as a robotic arm operates between the source story pole 2207 and the target story pole 2205 to intercept a laser beam that traverses between the two story poles and thus properly position a brick on a wall to be constructed. In FIG. 22, a base wall 2201 such as, for example, a block wall, is depicted. A finish wall 2203 is also shown being constructed by the robotic brick laying system of the present invention. The source story pole 2207 is attached to a wall being constructed, or being constructed upon and comprises a laser line beacon positioning system 2209 that contains a source laser that provides a source of collimated light that is projected on a target story pole 2205 to achieve brick course placement. The distance between the source story pole 2207 and the target story pole 2205 may be 20 to 30 feet up to 60 to 100 feet or more. For corners of buildings, the target story pole or the source story pole may be mounted to the adjacent wall with an angle bracket. It may be beneficial in some embodiments of the present invention to start several courses of brick by hand to create starting courses that the story poles can work from. In some embodiments of the present invention, as courses of bricks are laid and one must move upward, the story poles may have a notch or other mating surface to receive another story pole. The story poles, in some embodiments of the present invention, may be belt driven, expandable rack and pinion, or the like.

Figure 23:
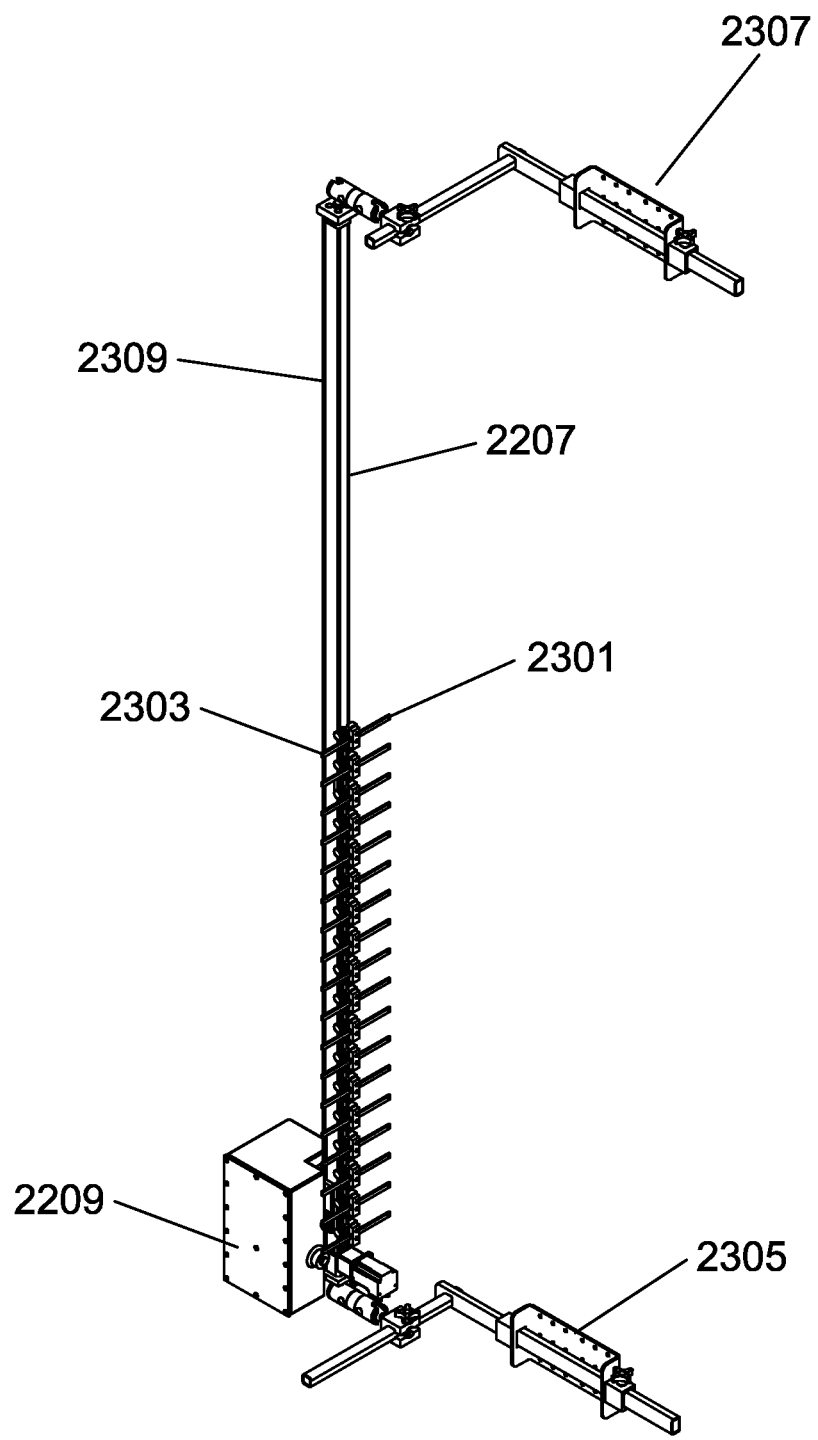
FIG. 23 is a perspective view of a second embodiment of the laser line beacon positioning system.

FIG. 23 is a perspective view of a second embodiment of the laser line beacon positioning system and in particular the source story pole 2207 having a laser line beacon positioning system 2209 connected to a guide rail 2309 to allow for freedom of movement along a vertical axis. A motor such as a servo motor with belts, chains, or a gear rack may be employed to move the laser line beacon positioning system along the guide rail 2309. The guide rail 2309 and related laser line beacon positioning system 2209 are temporarily connected to a wall or a wall under construction with a lower mount 2305 and an upper mount 2307. Will alignment pins 2301 are adjustably connected to the guide rail 2309 and may also extend outward toward a wall under construction or constructed to determine and indicate spacing of, for example, mortar joints. Laser alignment pins 2303 can also be used to allow the laser source from the laser line beacon positioning system to sense the location of each target tab (see FIG. 28).

Figure 24:
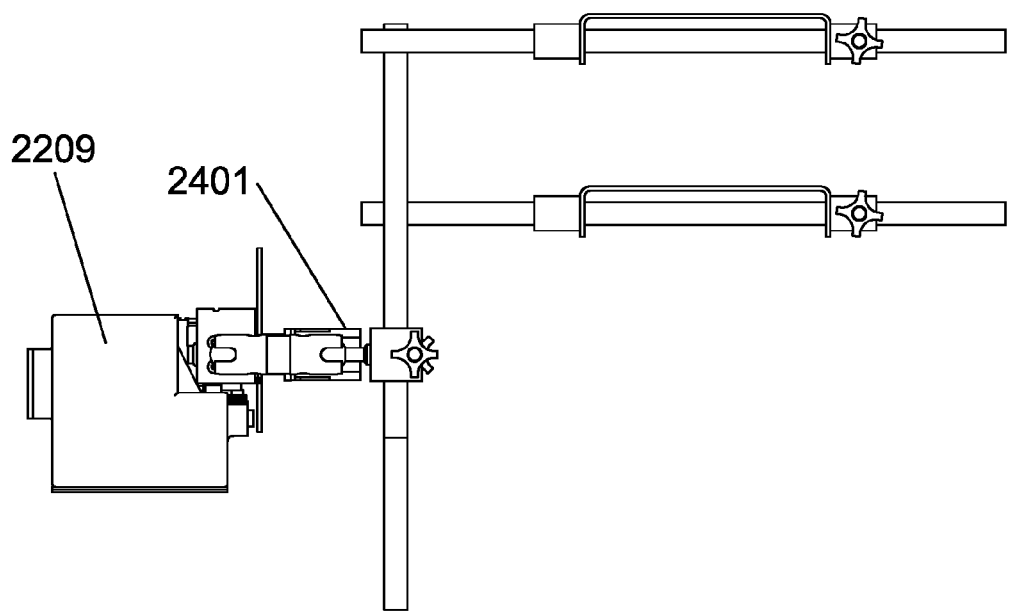
FIG. 24 is a top plan view of a second embodiment of the laser line beacon positioning system.

FIG. 24 is a top plan view of a second embodiment of the laser line beacon positioning system 2209. To facilitate alignment of the laser line beacon positioning system, a universal coupling 2401 can be seen to allow for movement along several axes. In some embodiments of the present invention, the universal coupling 2401 may be adjusted on multiple axes individually for ease of setup.

Figure 25:
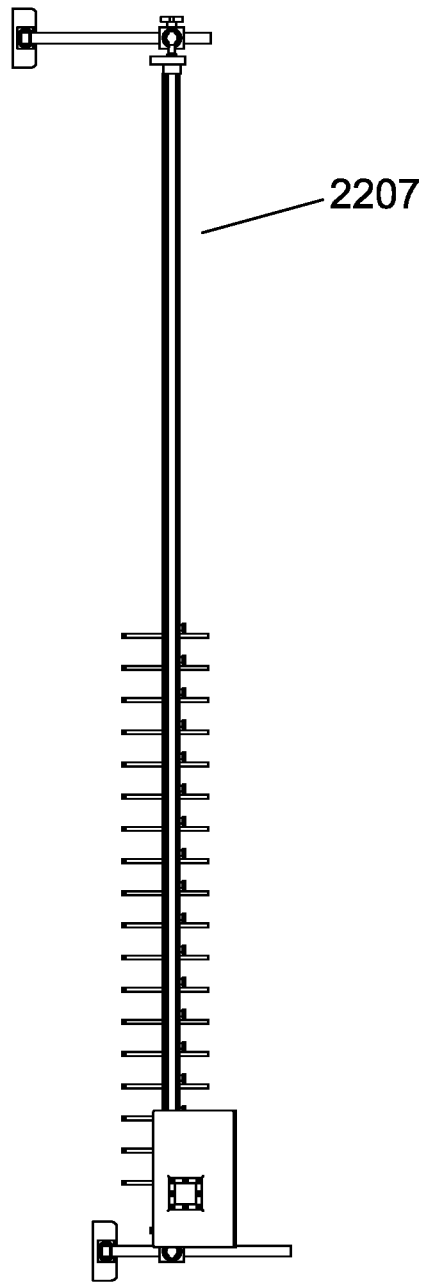
FIG. 25 is a side view of a second embodiment of the laser line beacon positioning system.

FIG. 25 is a side view of a second embodiment of the laser line beacon positioning system showing the source story pole 2207 with the laser line beacon positioning system 2209 attached to the guide rail for linear movement thereof.

Figure 26:
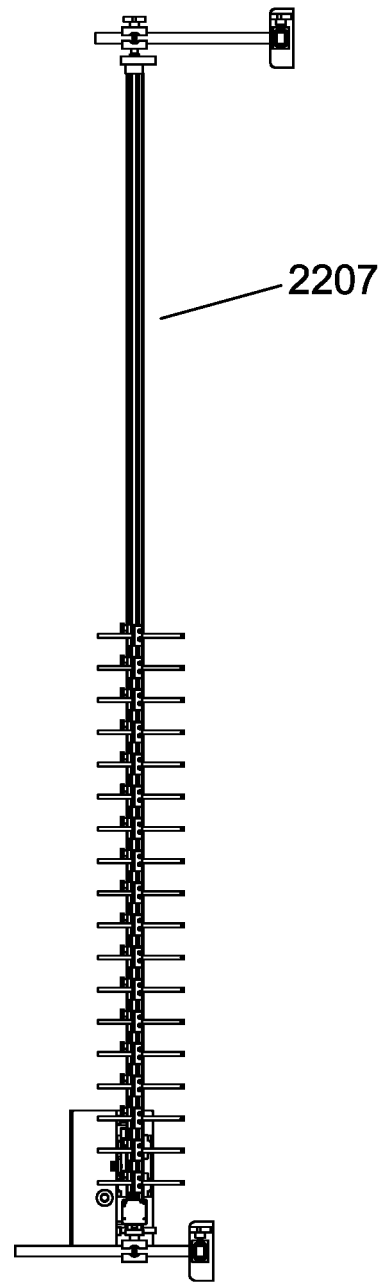
FIG. 26 is an opposing side view of a second embodiment of the laser line beacon positioning system.

FIG. 26 is an opposing side view of a second embodiment of the laser line beacon positioning system, again showing the laser line beacon positioning system 2209 as well as the wall alignment pins and the laser alignment pins. One can envision the source story pole attached to a wall under construction in the position depicted by way of FIGS. 25 and 26.

Figure 27:
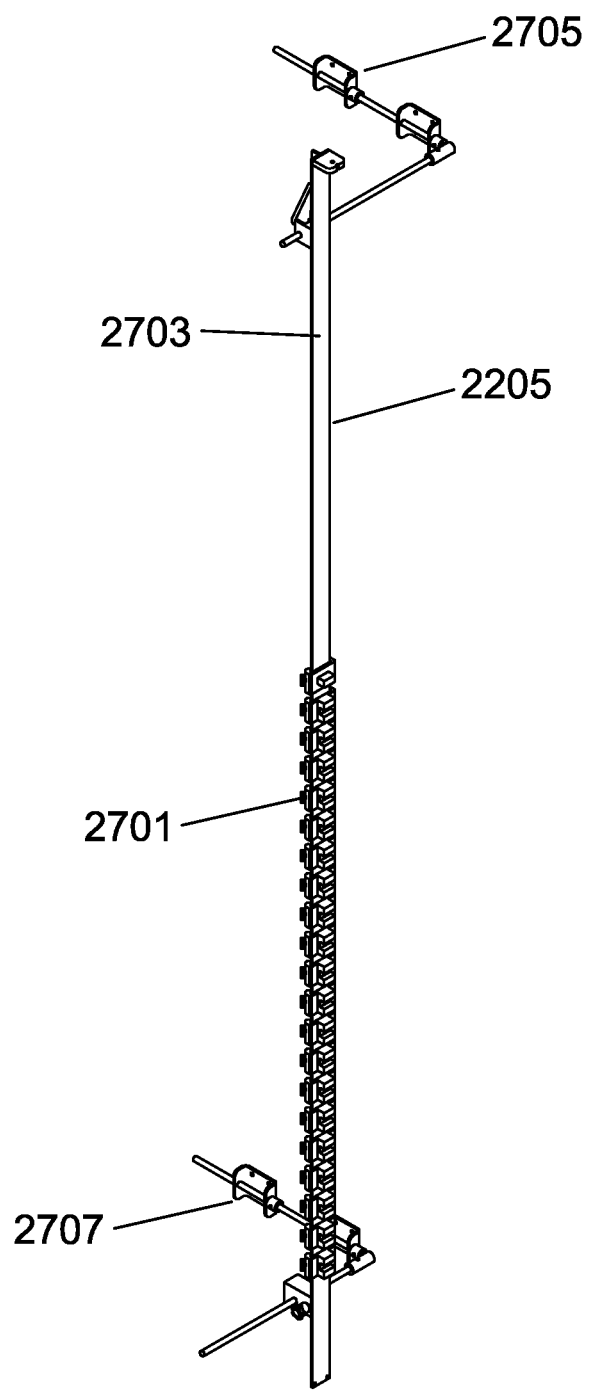
FIG. 27 is a perspective view of is target story pole.

FIG. 27 is a perspective view of a target story pole 2205. As previously described, the laser source is incident upon the targets 2701 to sense proper alignment of the laser line. The targets 2701 may be made of as metal or a plastic, and comprise at least one change of dimension such that the laser senses that transition for placement purposes. In some embodiments of the present invention, the targets are made of or coated with a reflective material for increased signal fidelity and improved accuracy. In some embodiments of the present invention, the targets may be considered active targets, that is, the targets may be a sensor that converts incident photons from a light source such as the laser light source of the laser line beacon into an electrical signal such as a voltage or current that can then be used for digital signal processing and computing purposes. Photo detectors, photo sensitive diodes, CCD arrays, various silicon and semiconductor sensors and the like may be employed as active targets. In addition, digital cameras may be used either directly or by viewing a passive target (one that does not provide a direct electrical signal from incident photons) and detecting the laser mark, spot, or the like. The targets 2701 are contained on a guide rail 2703 by way of slides, tabs, or the like. The target story pole 2205 is affixed or otherwise mounted to a wall under construction with an upper mount 2705 and a lower mount 2707. Each mount comprises mounting fixtures such as brackets or braces with holes for placement of fasteners through the bracket or brace and into the wall under construction or a suitable anchoring surface. The target story pole may vary in length, with longer poles providing increased system efficiency in some embodiments of the present invention.

Figures 28, 29:
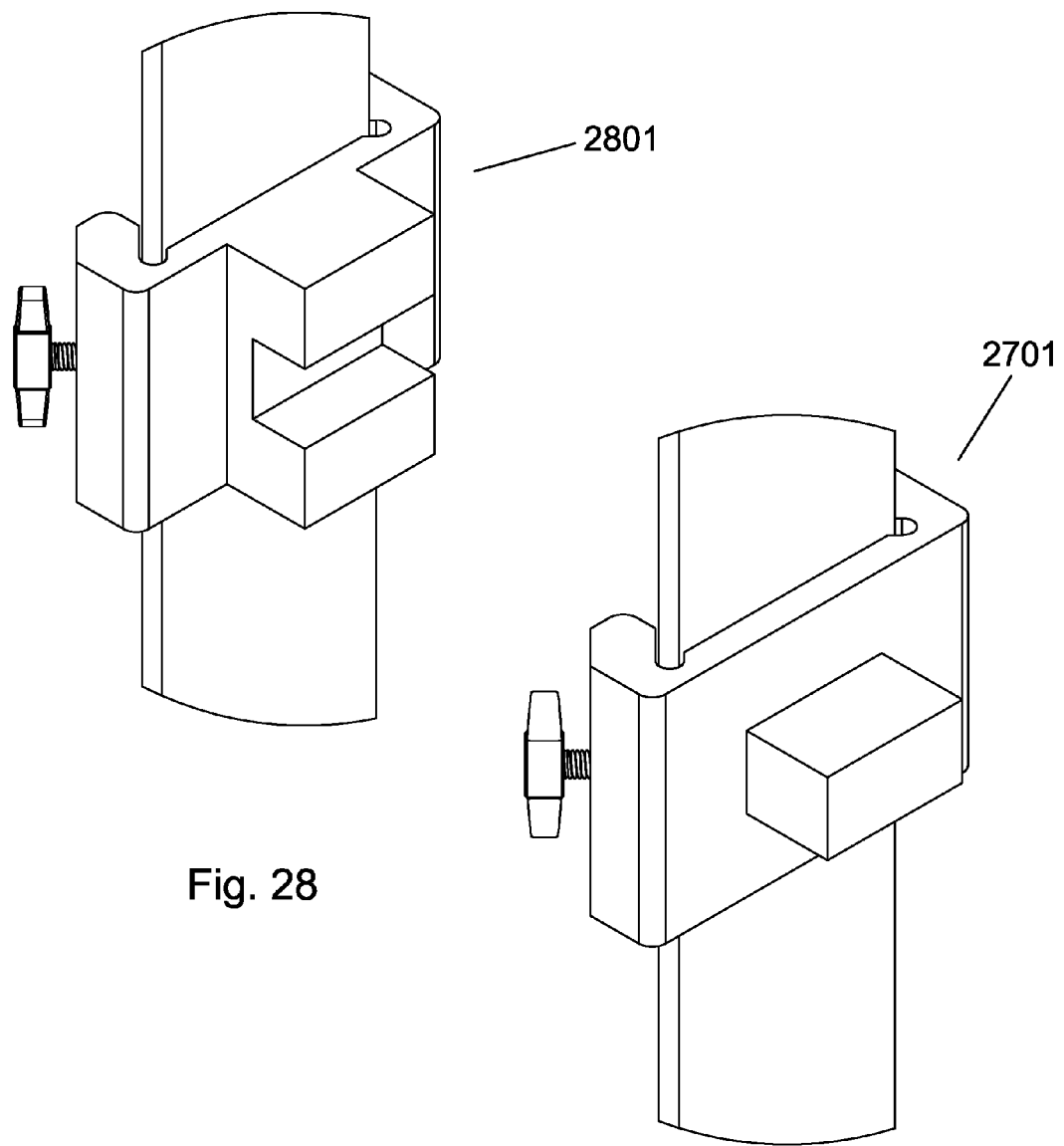
FIG. 28 is a perspective view of a target tab.
FIG. 29 is a perspective view of an alternate embodiment of a target tab.

FIG. 28 is a perspective view of a target tab 2801 showing the change of dimension in the form of is recess and a protrusion. The target tab 2801 has a bracket arrangement that slidably retains the guide rail 2309. FIG. 29 is a perspective view of an alternate embodiment of a target tab 2701 with a protrusion forming the change of dimension necessary for detection by the laser source.

Figure 30:
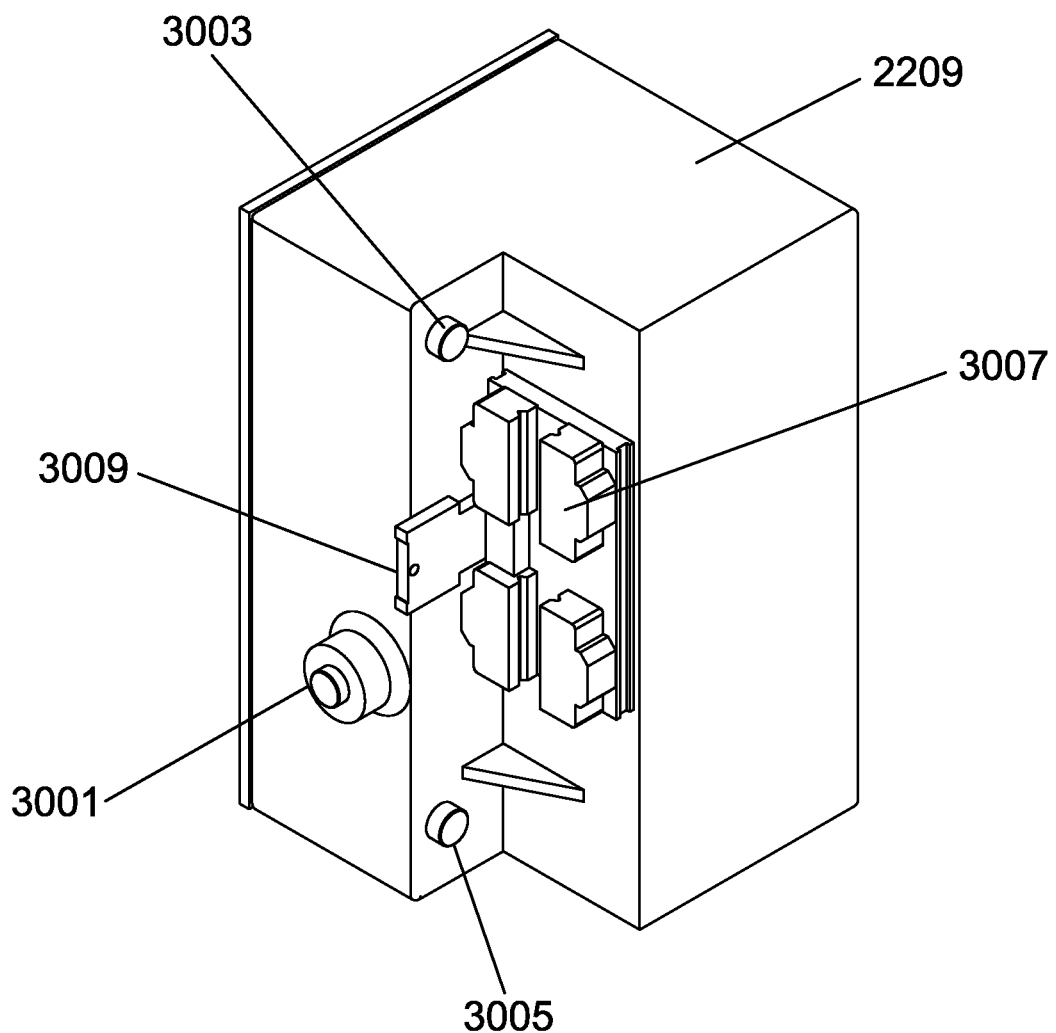
FIG. 30 is a rear perspective view of a laser line beacon positioning system.

FIG. 30 is a rear perspective view of a laser line beacon positioning system 2209 showing clearly the guide rail slides 3007 that allow the laser line beacon positioning system 2209 to move up and down the guide rail (see FIG. 23). A proximity sensor 3001 can be seen to sense position of the laser line beacon positioning system 2209. A top out sensor 3003 and a bottom out sensor 3005 can also be seen to provide a signal to stop linear movement of the laser line beacon positioning system when it reaches the top or the bottom of the guide rail. In some embodiments of the present invention, a thumb screw retainer 3009 or similar mechanical fastener is employed to maintain a determined position of the laser line beacon positioning system 2209 on the guide rail (not shown in FIG. 30, see FIG. 23).

Figure 31:
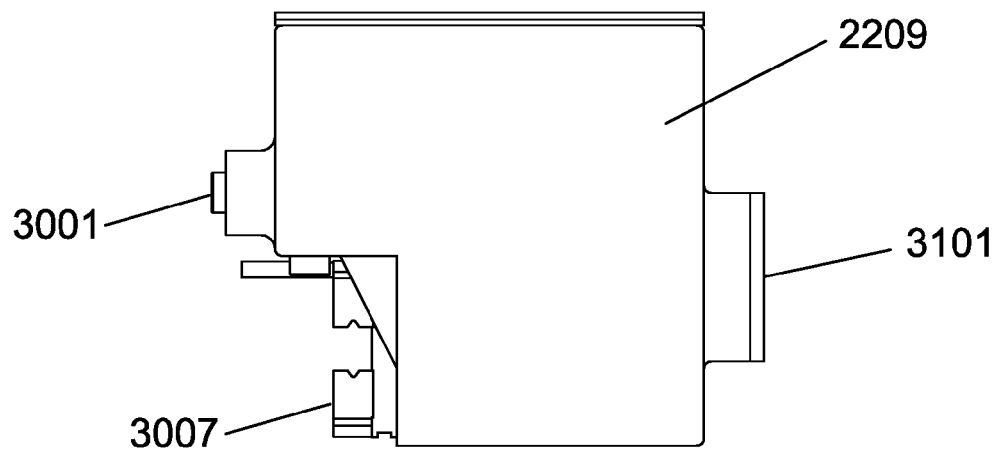
FIG. 31 is a top plan view of a laser line beacon positioning system.
Figure 32:
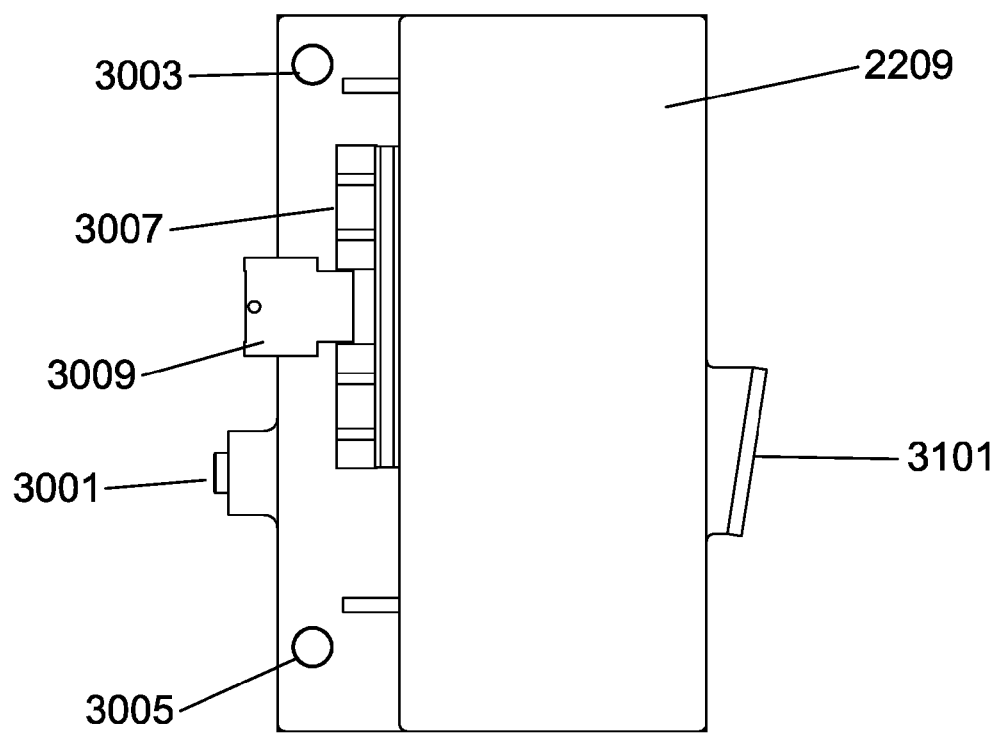
FIG. 32 is a side plan view of a laser line beacon positioning system.

FIG. 31 is a top plan view of a laser line beacon positioning system 2209 showing the laser receiver 3101 and related laser cover glass and fixture. As seen in FIG. 32, which is a side plan view of the laser line beacon positioning system 2209, the laser cover glass is retained at an angle to prevent noise from entering the system by unwanted reflective signals to the laser range finder contained within the laser line beacon positioning system 2209. In addition, angling the laser cover glass as shown also helps to keep the laser cover glass clean.

Figure 33:
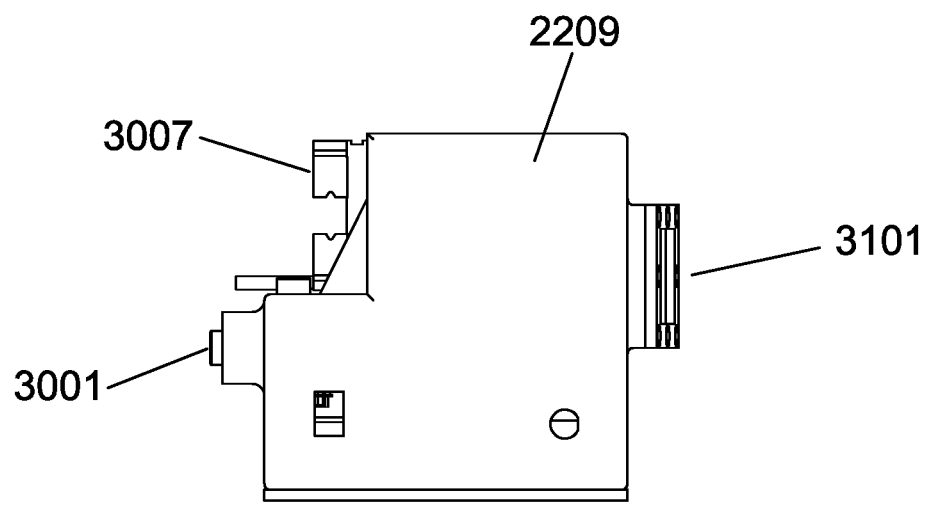
FIG. 33 is a bottom plan view of a laser line beacon positioning system.

FIG. 33 is a bottom plan view of the laser line beacon positioning system showing in further detail the guide rail slides 3007 as well as the laser receiver 3101.

Figure 34:
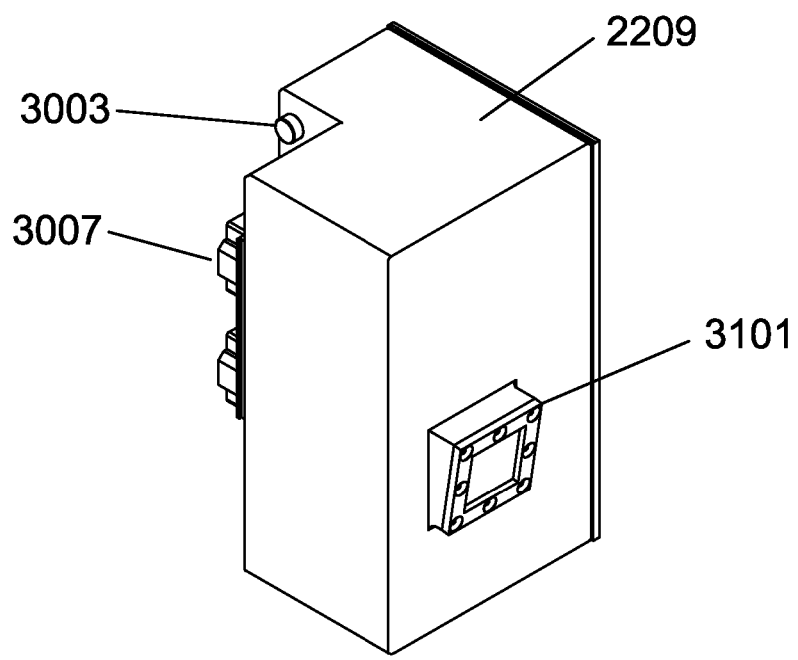
FIG. 34 is a side perspective view of a laser line beacon positioning system.

FIG. 34 is a side perspective view of the laser line beacon positioning system which shows the novel downward angle of the laser receiver 3101 cover glass and fixture.

Figure 35:
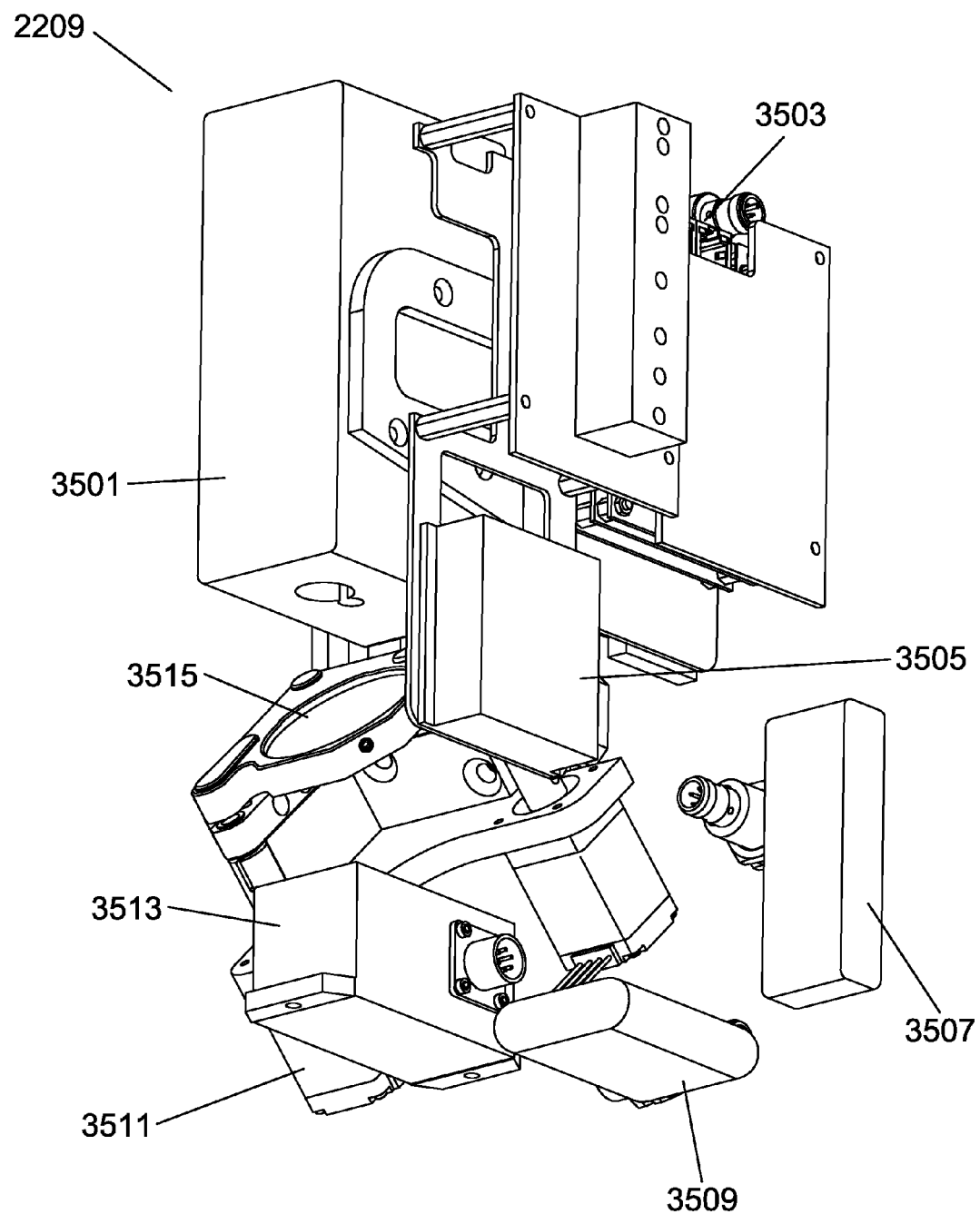
FIG. 35 depicts the internal components of a laser line beacon positioning system.

To facilitate a complete understanding of the laser line beacon positioning system. FIG. 35 depicts the internal components of the laser line beacon positioning system 2909. A laser 3501 and related power supply and optics can be seen. The laser is then incident on a mirror 3515 that may, in some embodiments of the present invention, be adjustable. The mirror 3515 then projects the laser light outward and toward the target story pole and associated targets. The laser light is also intercepted by the laser line receiver on the robotic arm assembly, as further depicted and described by way of FIG. 36. Micro controller 3503 can be seen to provide control circuitry, logic, sensing and processing. A stepper motor driver 3505 can also be seen along with to motor/encoder 3511. In some embodiments of the present invention, a Bluetooth or similar radiofrequency interface 3507 can be seen. In addition, in some embodiments of the present invention, a wi-fi interface 3509 may also be employed. Further, in some embodiments of the present invention an inclinometer 3513 may also be incorporated into the sensing and control circuitry of the laser line beacon positioning system 2209.

Figure 36:
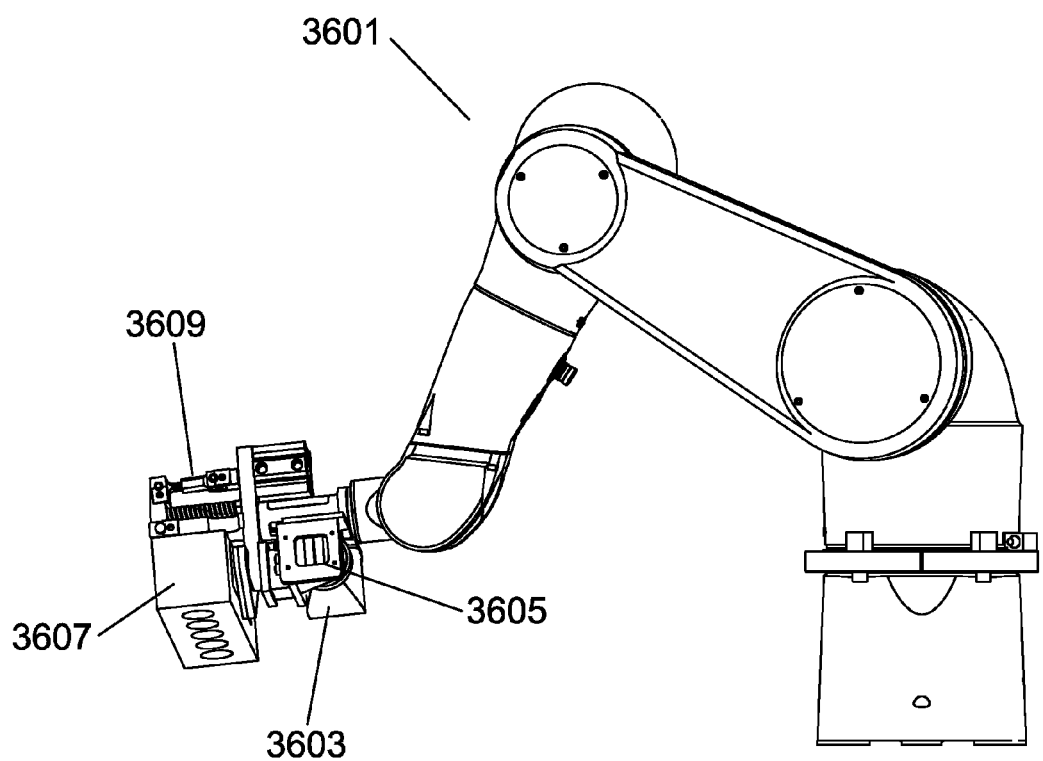
FIG. 36 is a side view of a robotic arm assembly of the present invention.

Once alignment of the laser is made between the laser or source story pole and the target story pole, indicating a straight line for brick or block placement, a moveable assembly such as a robotic arm assembly with a laser line receiver 3603 intercepts the laser light, and uses the aligned laser light as a reference for brick or block placement. FIG. 36 depicts a side view of a robotic arm assembly 3601 of the present invention. A laser line receiver 3603 can be seen that comprises a sensor such as a CCD array. A laser receiver cover 3605 can also be seen where the cover comprises a diffuse glass that is both reflective and translucent such that a return signal of the laser light can also be detected for distance measurement. In one embodiment of the present invention, the CCD array or camera detects the laser spot on a two dimensional x-y coordinate system. In another embodiment of the present invention, the camera or CCD array is now an observer, where the laser spot is not incident on the camera or CCD array, but rather, detects the laser spot incident on a surface. The laser line receiver 3603 intercepts the aligned laser beam from the laser story pole to the target story pole to provide a reference for the proper placement of bricks, blocks, or other building elements. Also seen in FIG. 36 is a brick 3607 held by the end effector 3609 of the robotic arm assembly 3601.

Figure 37:
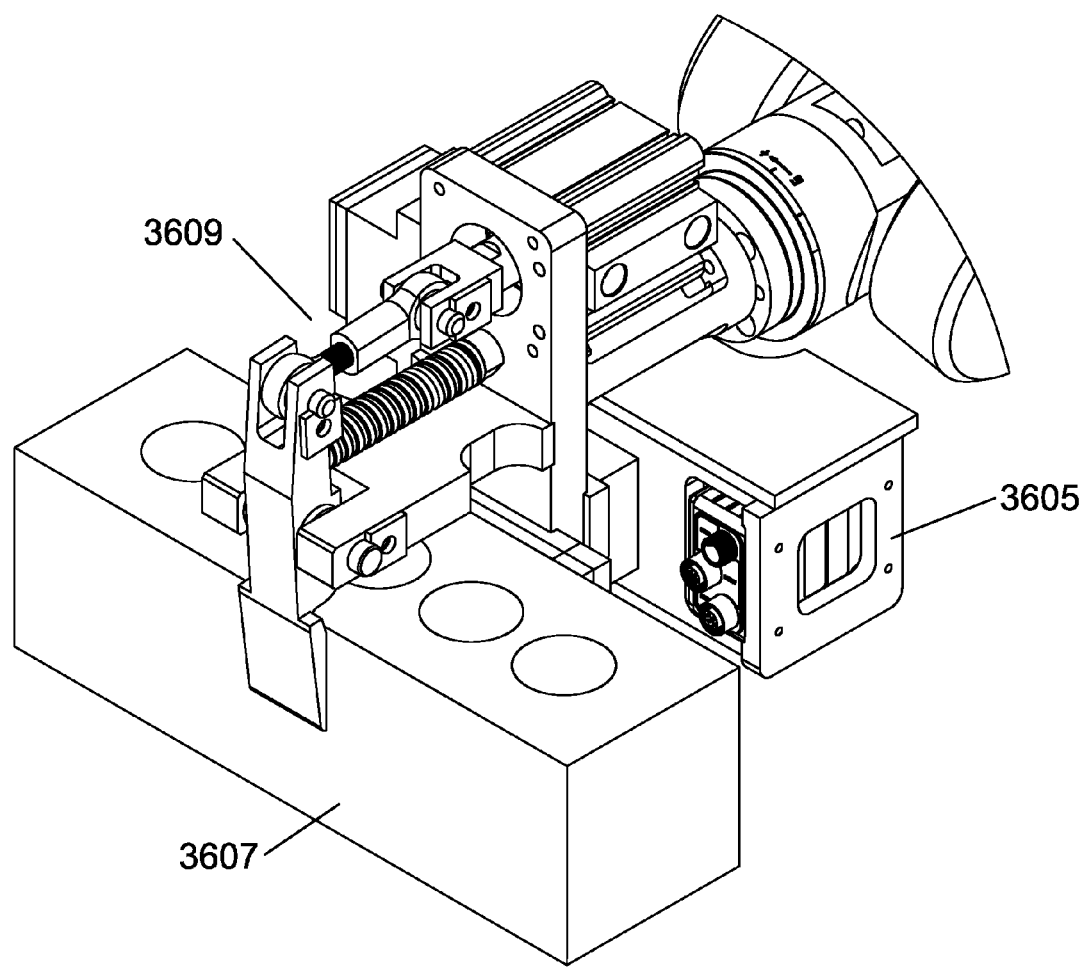
FIG. 37 is a close up view of an end effector of the robotic arm assembly of the present invention.

FIG. 37 is a close up view of an end effector of the robotic arm assembly of the present invention showing clearly the end effector 3609 grasping a brick 3607 as well as the laser line receiver cover 3605.

Figure 38:
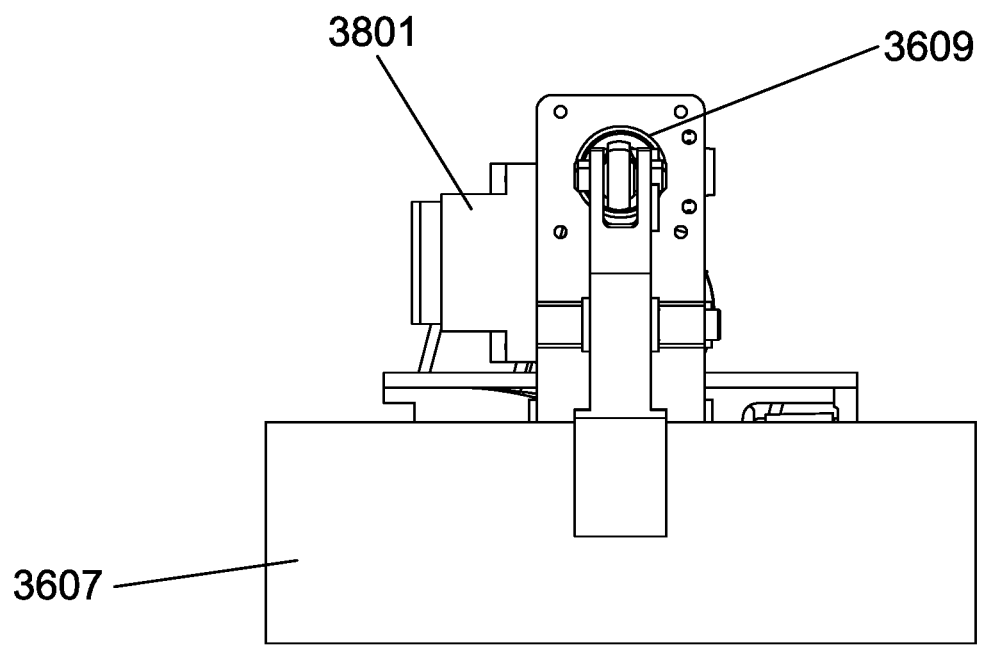
FIG. 38 is a front plan view of an end effector of the robotic arm assembly of the present invention.

FIG. 38 is a front plan view of an end effector of the robotic arm assembly of the present invention that shows a vibrator 3801. The vibrator 3801 may be an electromechanical device such as an electric motor with an eccentric weight attached to its shaft, or it may be a piezoelectric device, at resonating coil type device, or the like. The vibrator 3801 transfers vibrations from the end effector into the brick, block or building element 3607 to facilitate improved bedding of the building element in mortar. It has been found by the inventors that introducing vibrational frequencies into the brick or building element bedding process, the mortar has better adhesion to the brick or building element.

Figure 39:
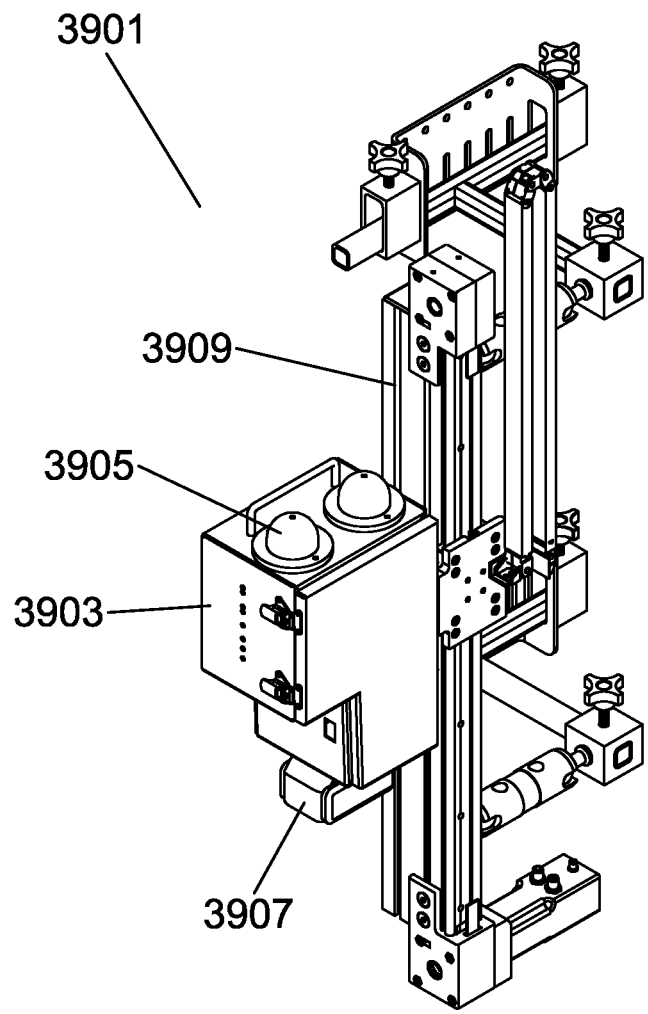
FIG. 39 is a perspective view of another embodiment of the laser line beacon positioning system.

FIGS. 39-44 depict another embodiment of the laser line beacon positioning system and related laser source story pole. FIG. 39 is a perspective view of another embodiment of the laser line beacon positioning system and laser source story pole 3901 showing the laser line beacon positioning system 3903 in a metal enclosure with antennae domes 3905 to ensure that the radiofrequency signal from Bluetooth, wi-fi or similar radiofrequency signal can pass through the enclosure. The radiofrequency link of the laser line beacon positioning system allows a user to control the position of the laser line beacon and related carriage along the story pole to achieve the desired alignment by way of a remote control device (not pictured). The remote control device may, in some embodiments, be a smart phone or similar hand held electronic device that may also contain a software application (such as an "app") to facilitate remote and wireless connectivity with the laser line beacon positioning system. In addition, other functions such as on/off, laser line beacon operation and pulsing, and the like, may also be controlled by way of the radiofrequency link between the laser line beacon positioning system and the hand held or remote electronic device. The antennae domes are made from a radiofrequency transparent material such as a plastic or the like. In addition, to power the laser line beacon positioning system 3903, a rechargeable battery pack 3907 can be seen where the battery pack can be removed for recharging. A guide rail 3909 can also be seen along with mounting hardware and the like.

Figure 40:
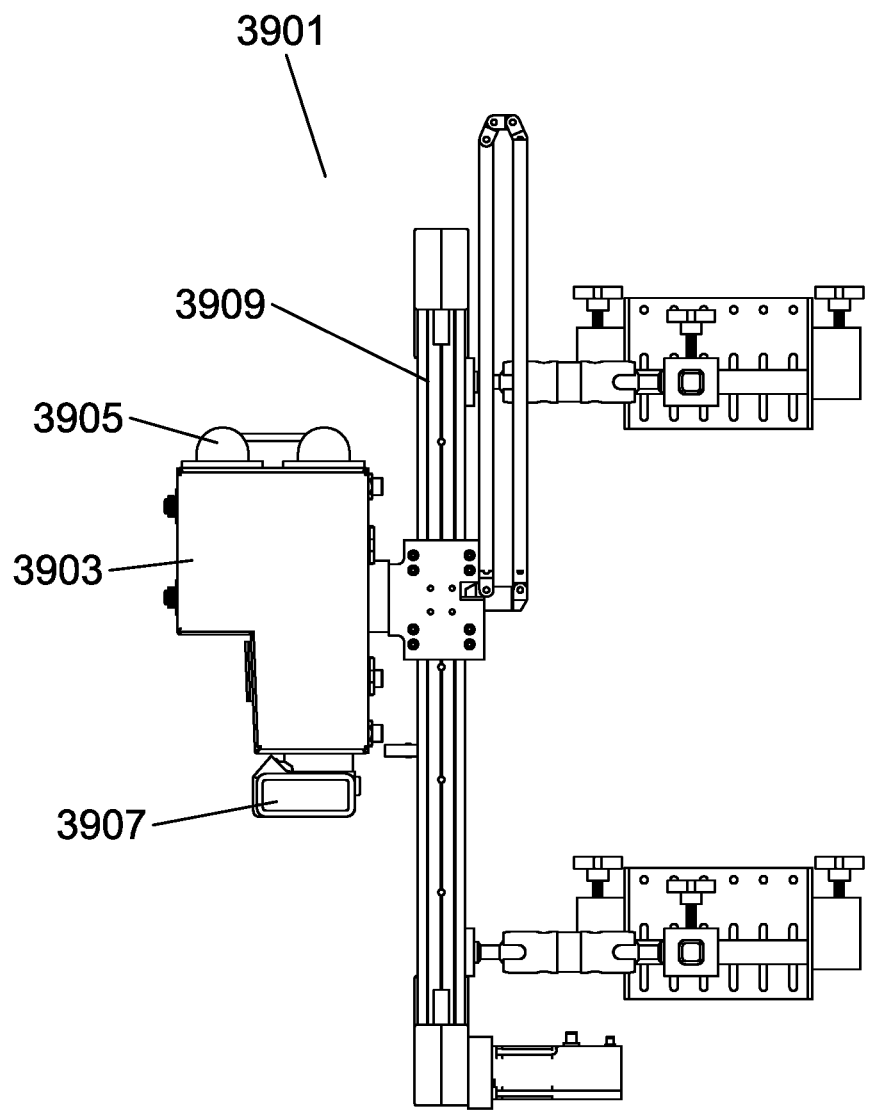
FIG. 40 is a front plan view of another embodiment of the laser line beacon positioning system.
Figure 41:
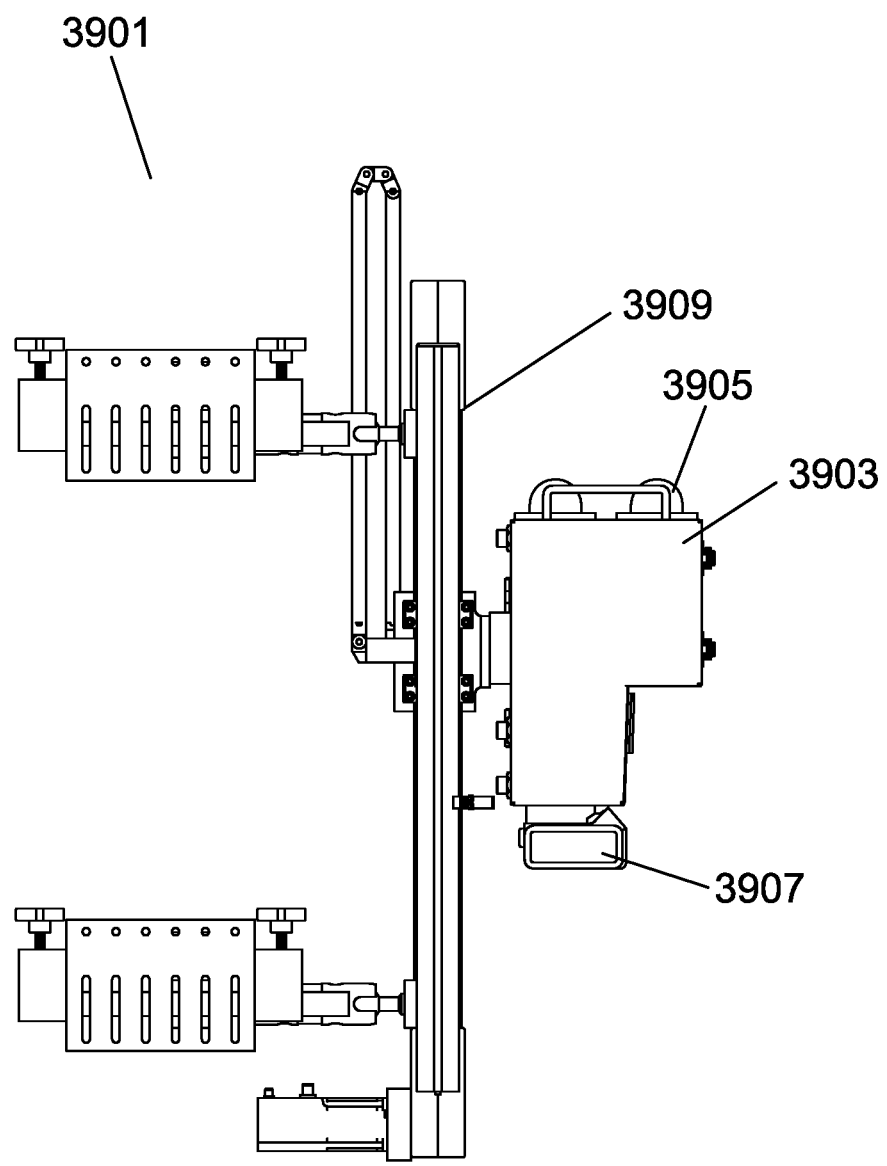
FIG. 41 is a rear plan view of another embodiment of the laser line beacon positioning system.
Figure 42:
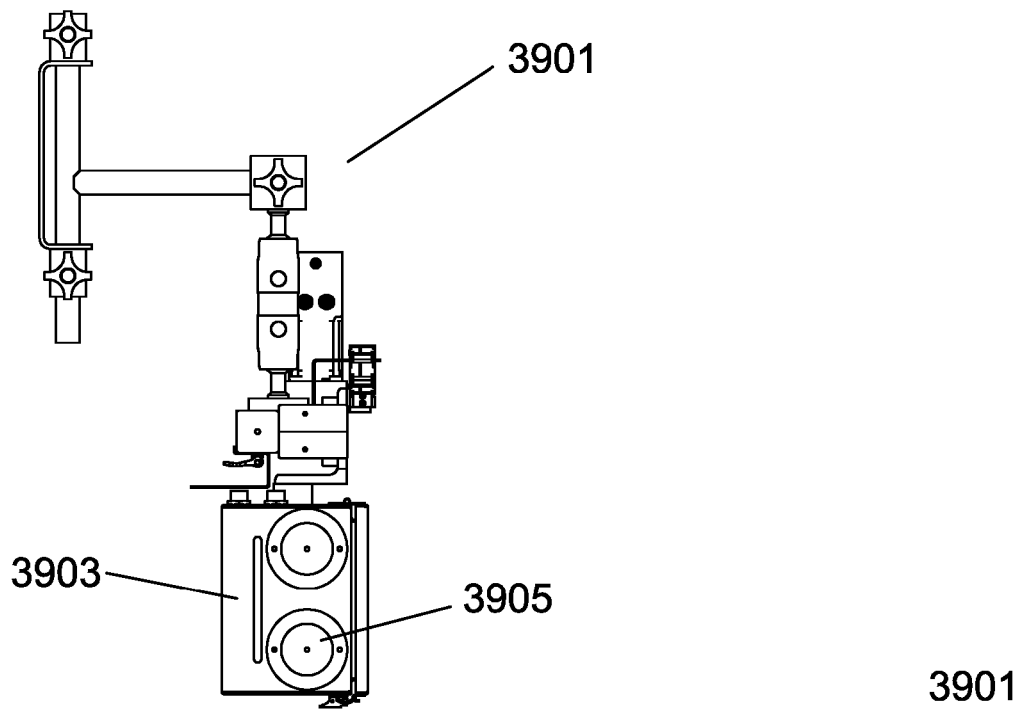
FIG. 42 is a top plan view of another embodiment of the laser line beacon positioning system.
Figure 43:
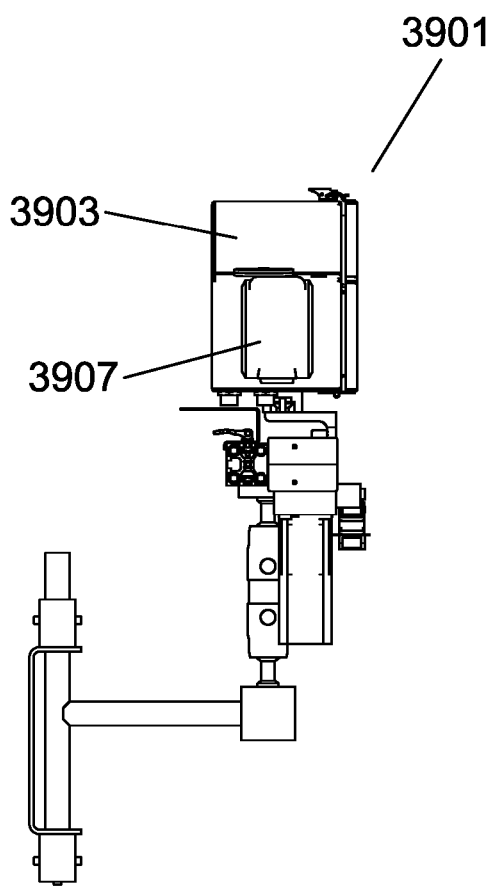
FIG. 43 is a bottom plan view of another embodiment of the laser line beacon positioning system.
Figure 44:
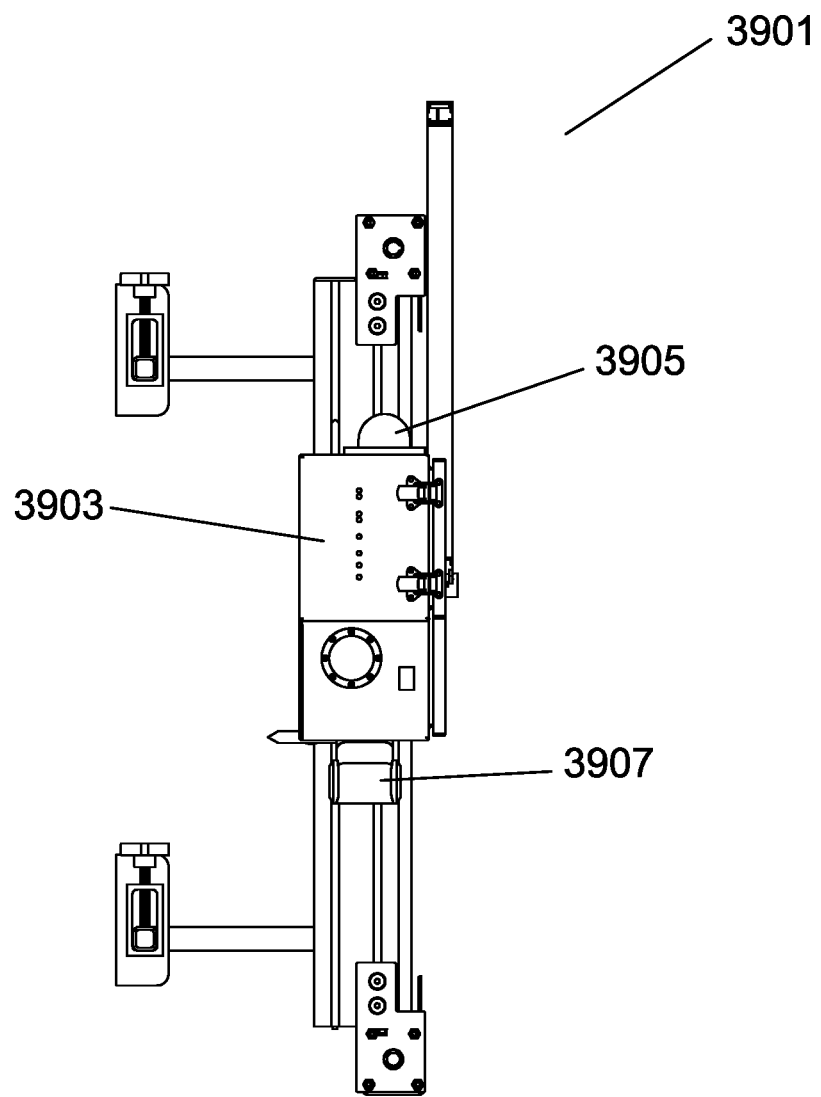
FIG. 44 is a side plan view of another embodiment of the laser line beacon positioning system.

FIG. 40 is a front plan view of this alternate embodiment of the laser line beacon positioning system. FIG. 41 is a rear plan view of this alternate embodiment of the laser line beacon positioning system. FIG. 42 is a top plan view of this alternate embodiment of the laser line beacon positioning system. FIG. 43 is a bottom plan view of this alternate embodiment of the laser line beacon positioning system. FIG. 44 is a side plan view of this alternate embodiment of the laser line beacon positioning system.

In as further embodiment, a laser line beacon positioning system employs a level such as an inclinometer to eliminate the need for a target story pole. The laser line beacon positioning system thus becomes self-leveling, allowing a laser line receiver on a moveable assembly to intercept laser light from the laser line beacon positioning system without the need to strike a target story pole. It should be noted that the incorporation of a level in the target story pole may be advantageous as well, and is included in the spirit and scope of the present invention described herein. Levels such as inclinometers are considered to be electronic sensing and measurement devices that provide a useful electrical output proportional to tilt, inclination, or related variables. Various sensors may be employed as electronic levels or inclinometers, such as, but not limited to, fluid filled capacitance, conductive, magnetic, bubble, and MEMS based technologies. One axis and two axis sensors may be employed.

Figure 45:
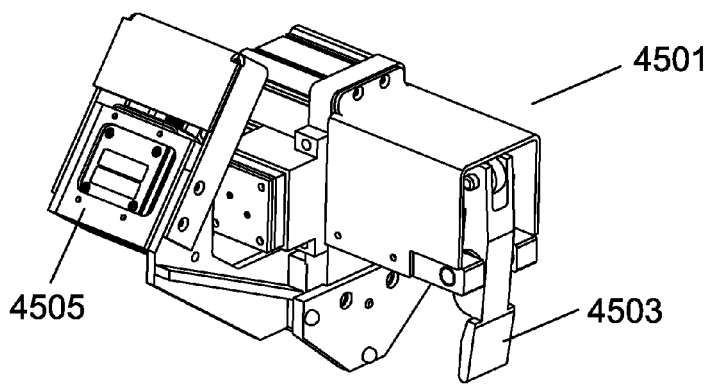
FIG. 45 is a perspective view of an alternate embodiment of the end effector of the robotic arm assembly.
Figure 46:
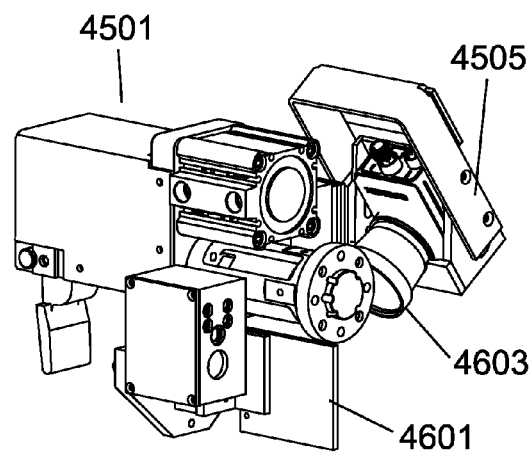
FIG. 46 is a rotated perspective view of an alternate embodiment of the end effector of the robotic arm assembly.
Figure 47:
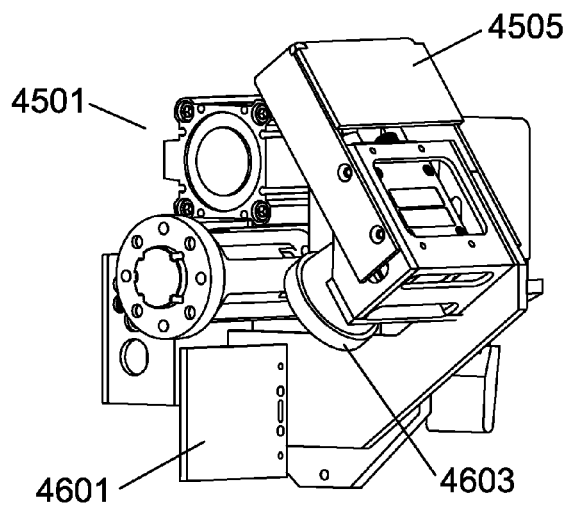
FIG. 47 is a further rotated perspective view of an alternate embodiment of the end effector of the robotic arm assembly.

FIGS. 45-47 depict several perspective views of an alternate embodiment of the end effector 4501 of the robotic arm assembly. The end effector has a brick grasping appendage 4503 for proper retention and release of a brick or similar building element. To detect incident laser light for positioning, a camera 4505 is used to view or image a laser spot that is incident on the target plate 4601. The target plate 4601 may, in some embodiments of the present invention, be made from a plate of metal such as aluminum, a plastic, or the like. A camera lens 4603 collects the image of the laser spot incident on the target plate 4601 which is then overlaid on a coordinate system and assigned values for subsequent computer processing, resulting in alignment and control of the end effector of the robotic arm assembly.

It can therefore be seen that in use, the laser positioning system of the present invention provides a positioning and guidance system that uses a laser to accurately determine in real time the position of a moveable assembly, such as a robotic arm assembly, during operation even in environments that have external disturbances such as those caused by wind, equipment movement, vibration, and the like. To use the laser positioning system, the laser line beacon originates a laser source that strikes as target to determine alignment of two story poles. The laser line beacon moves along a story pole until alignment is achieved by way of sensing when the originating laser source strikes a transitional object, such as a tab, on the target. A moveable assembly, such as a robotic arm assembly, having a laser line receiver intercepts the aligned laser source which in turn optically communicates the incident light to a sensor such as a duo-lateral sensor, camera, or the like, where x and z positioning information is provided to appropriate digital processing circuitry to determine the position of the moveable assembly, such as a robotic arm assembly. A laser range finder may also be used in conjunction with a laser reflector plate mounted on the moveable assembly to act as a string line during brick, block, stone, or building element laying operations.

The outputs of the sensors, such as the output of the laser line receiver, may be encoded or otherwise converted or processed in various ways and used as part of a computer program or programs to help facilitate control of the motion of the moveable assembly. The output of active targets, for example, may also he used in such a way. In addition, the movement of the laser line beacon and output of the laser line beacon may be under computer control, and may also, in some embodiments, be part of a feedback system to facilitate proper movement of the moveable assembly such as a robotic arm assembly.

It is, therefore, apparent that there has been provided, in accordance with the various objects of the present invention, a laser positioning system.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims, and drawings appended herein.

What is claimed is:

1. A laser positioning system for defining the absolute position of an element under the influence of external disturbances, the laser positioning system comprising:
   a laser line beacon positioning system comprising a laser story pole and a laser line beacon;
   wherein the laser line beacon comprises a laser light source configured to produce a laser light;
   a target story pole having at least one target for alignment with the laser line beacon positioning system; and
   a laser line receiver coupled to a moveable assembly and configured to intercept the laser light from the laser line beacon positioning system to provide a reference for accurate moveable assembly motion;
   wherein the laser line receiver operates between the laser story pole and the target story pole.

2. The laser positioning system of claim 1, wherein the moveable assembly is a robotic arm assembly.

3. The laser positioning system of claim 1, wherein the moveable assembly is a brick-laying robotic arm assembly.

4. The laser positioning system of claim 1, wherein the laser line beacon positioning system further comprises a laser range finder.

5. The laser positioning system of claim 4, further comprising an angled laser cover glass to protect the laser range finder and to prevent unwanted reflective signals from entering the laser range finder.

6. The laser positioning system of claim 1, further comprising a moveable mount for the laser line beacon.

7. The laser positioning system of claim 1, wherein the laser line beacon positioning system further comprises a level.

8. The laser positioning system of claim 1, wherein the target story pole further comprises a level.

9. The laser positioioning system of claim 1, wherein at least one target is moveable.

10. The laser positioning system of claim 1, wherein the at least one target comprises a change in dimension to interrupt the produced laser light from the laser line beacon.

11. The laser positioning system of claim 10, wherein the change of dimension is a protrusion.

12. The laser popositioning system of claim 10, wherein the change of dimension is a recess.

13. The laser positioning system of claim 1, wherein the at least one target comprises an optical sensor.

14. The laser positioning system of claim 1, wherein the laser line receiver is a fiber optic bundle.

15. The laser positioning system of claim 1, wherein the laser line receiver is a camera.

16. The laser positioning system of claim 15, further comprising a target plate coupled to the moveable assembly, wherein the target plate is in visual communication with the laser line receiver camera.

17. The laser positioning system of claim 1, wherein the laser line beacon positioning system further comprises a radiofrequency link.

18. A laser positioning system for defining the absolute position of an element under the influence of external disturbances, the laser positioning system comprising:

a laser line beacon positioning system comprising a laser story pole, a laser line beacon, and a level;

wherein the laser line beacon comprises, a laser light source configured to produce a laser light;

a target story pole having at least one target for alignment with the laser line beacon positioning system; and a laser line receiver coupled to a moveable assembly and configured to intercept the laser light from the laser line beacon positioning system to provide a reference for accurate moveable assembly motion;

wherein the laser line receiver operates between the laser story pole and the target story pole.

19. The laser positioning system of claim 18, wherein the moveable assembly is a robotic arm assembly.

20. The laser positioning system of claim 18, wherein the moveable assembly is a brick-layering robotic arm assembly.

* * * * *

UNITED STATES PATENT AND TRADEMARK OFFICE
CERTIFICATE OF CORRECTION

PATENT NO. : 10,240,949 B2  
APPLICATION NO. : 15/009958  
DATED : March 26, 2019  
INVENTOR(S) : Scott Lawrence Peters et al.

Page 1 of 1

It is certified that error appears in the above-identified patent and that said Letters Patent is hereby corrected as shown below:

In the Claims

Column 13, Line 1, Claim 12, 'The laser popositioning system' should read -The laser positioning system- Signed and Sealed this  
Seventh Day of April, 2020

Andrei Iancu  
*Director of the United States Patent and Trademark Office*